US012568526B2

(12) United States Patent
You et al.

(10) Patent No.: US 12,568,526 B2
(45) Date of Patent: Mar. 3, 2026

(54) COMMUNICATION METHOD AND COMMUNICATION APPARATUS

(71) Applicant: HUAWEI TECHNOLOGIES CO., LTD., Guangdong (CN)

(72) Inventors: Chunhua You, Shanghai (CN); Dawid Koziol, Leuven (BE); Yunhao Zhang, Shanghai (CN); Yinghao Guo, Shanghai (CN); Lei Chen, Beijing (CN); Rui Wang, Shanghai (CN); Xingxing Hu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 260 days.

(21) Appl. No.: 18/352,766

(22) Filed: Jul. 14, 2023

(65) Prior Publication Data

US 2023/0371064 A1 Nov. 16, 2023

Related U.S. Application Data

(63) Continuation of application No. PCT/CN2021/072287, filed on Jan. 15, 2021.

(51) Int. Cl.
| | |
|---|---|
| *H04W 74/00* | (2009.01) |
| *H04W 74/0833* | (2024.01) |
| *H04W 74/0836* | (2024.01) |

(52) U.S. Cl.
CPC ..... *H04W 74/006* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| | | | |
|---|---|---|---|
| 2020/0214070 A1 | 7/2020 | Ingale et al. | |
| 2020/0314664 A1* | 10/2020 | Zhou | H04L 25/0226 |
| 2020/0322948 A1 | 10/2020 | Xue et al. | |
| 2021/0014011 A1* | 1/2021 | Xiong | H04L 1/1887 |
| 2021/0076445 A1* | 3/2021 | Tsai | H04W 74/0833 |
| 2021/0227586 A1* | 7/2021 | Huang | H04W 52/242 |
| 2021/0243777 A1* | 8/2021 | Tsai | H04W 74/006 |
| 2021/0329593 A1* | 10/2021 | Lee | H04W 68/02 |

(Continued)

FOREIGN PATENT DOCUMENTS

| | | | | |
|---|---|---|---|---|
| CN | 112470546 A | * | 3/2021 | ............ H04W 72/23 |
| CN | 116171605 A | * | 5/2023 | ............ H04W 68/02 |

(Continued)

OTHER PUBLICATIONS

Huawei et al., "Discussion on CG-based scheme," 3GPP TSG-RAN WG2 #112-e, R2-2010281, Online, Nov. 2-13, 2020, 17 pages.

(Continued)

*Primary Examiner* — Brandon M Renner
(74) *Attorney, Agent, or Firm* — Fish & Richardson P.C.

(57) ABSTRACT

This application provides communication methods and apparatuses. One method includes: accessing, by a terminal device, an access network device by performing first random access in a radio resource control inactive (RRC inactive) state, and receiving, by the terminal device by using a first receive beam for downlink transmission of the first random access, downlink control information (DCI) transmitted by the access network device.

18 Claims, 19 Drawing Sheets

First access network device / Terminal device

1201: The terminal device in a radio resource control inactive RRC inactive state transmits a second message 1 to the access network device 1202: Transmit a second message 2 to the terminal device, where the second message 2 includes a second temporary C-RNTI 1203: Transmit a second message 3 to the first access network device, where the second message 3 includes a C-RNTI of the terminal device 1204: Transmit a second message 4 to the terminal device, where a PDCCH in the second message 4 is scrambled by the C-RNTI of the terminal device

(56) References Cited

U.S. PATENT DOCUMENTS

| | | | |
|---|---|---|---|
| 2023/0058706 A1* | 2/2023 | Liang ................. | H04W 52/0229 |
| 2023/0319892 A1* | 10/2023 | Zheng ............... | H04W 28/0205 |
| | | | 370/329 |
| 2023/0397225 A1* | 12/2023 | Zhang ................. | H04W 72/232 |
| 2024/0073920 A1* | 2/2024 | Turtinen ............. | H04W 72/232 |

FOREIGN PATENT DOCUMENTS

| | | |
|---|---|---|
| JP | 2019517210 A | 6/2019 |
| JP | 2020507980 A | 3/2020 |
| JP | 2020532203 A | 11/2020 |
| WO | 2018128020 A1 | 7/2018 |
| WO | 2020060205 A1 | 3/2020 |
| WO | 2020084878 A1 | 4/2020 |
| WO | 2020114294 A1 | 6/2020 |

OTHER PUBLICATIONS

Extended European Search Report in European Appln No. 21918612. 9, dated Feb. 5, 2024, 9 pages.

Office Action in Japanese Appln. No. 2023-543044, mailed on Jul. 8, 2024, 9 pages (with English translation).

3GPP TS 38.213 V15.12.0, "3rd Generation Partnership Project; Technical Specification Group Radio Access Network; NR; Physical layer procedures for control (Release 15)," Dec. 2020, 110 pages.

Mediatek Inc., "RA-based SDT," 3GPP TSG-RAN WG2 #112-e, R2-2009056, E-meeting, Nov. 2-13, 2020, 4 pages.

3GPP TS 38.300 V16.4.0, "3rd Generation Partnership Project; Technical Specification Group Radio Access Network; NR; NR and NG-RAN Overall Description; Stage 2 (Release 16)," Dec. 2020, 149 pages.

International Search Report and Written Opinion in International Appln. No. PCT/CN2021/072287, mailed on Jun. 28, 2021, 17 pages (with English translation).

Office Action in Japanese Appln. No. 2023-543044, mailed on Dec. 16, 2024, 10 pages (with English translation).

Communication pursuant to Article 94(3) EPC in European Appln. No. 21918612.9, mailed on Jan. 5, 2026, 11 pages.

* cited by examiner

Access network device

Terminal device

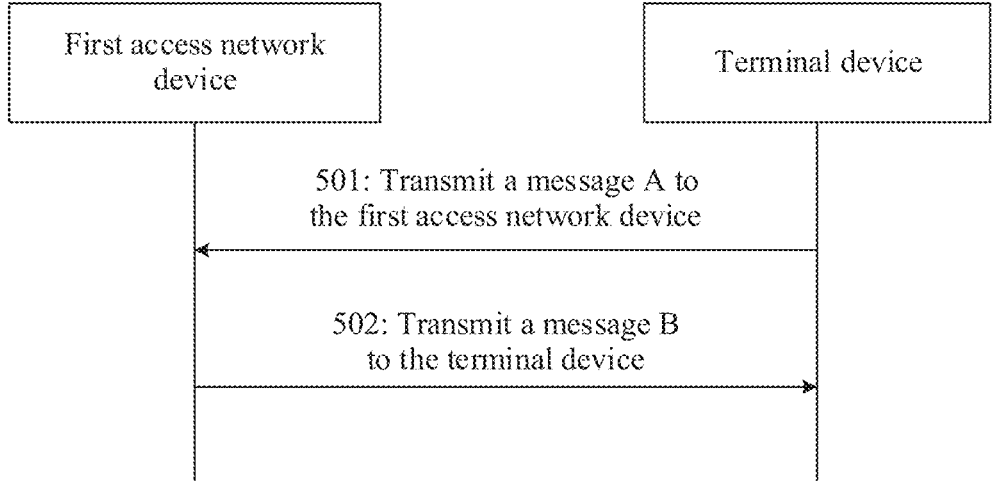

| First access network device | | Terminal device |

501: Transmit a message A to the first access network device

502: Transmit a message B to the terminal device

FIG. 5

| First access network device | | Terminal device |

601: In a radio resource control inactive RRC inactive state, transmit an RRC resume request and first uplink data to the first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state

FIG. 6

```
┌──────────────────────┐                    ┌──────────────────────┐
│  First access network│                    │    Terminal device   │
│        device        │                    │                      │
└──────────┬───────────┘                    └───────────┬──────────┘
           │                                            │
           │  701: In a radio resource control inactive RRC
           │  inactive state, transmit an RRC resume request
           │  and first uplink data to the first access network
           │  device through a first CG resource by using a first
           │  transmit beam, where the first transmit beam is the
           │  same as a transmit beam of the terminal device in
           │  an RRC connected state, or the first transmit beam
           │  is the same as a transmit beam in a previous data
           │  transmission process in which the terminal device
           │  is in the RRC inactive state
           │◄───────────────────────────────────────────│
           │  702: Transmit, to the terminal device, a first
           │  response transmitted for the RRC resume request
           │  and the first uplink data
           │───────────────────────────────────────────►│
```

702: Transmit, to the terminal device, a first response transmitted for the RRC resume request and the first uplink data 703: Receive, by using a first receive beam, the first response transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource

FIG. 7

```
┌─────────────────────┐                          ┌─────────────────────┐
│  First access network│                          │   Terminal device   │
│       device         │                          │                     │
└─────────────────────┘                          └─────────────────────┘
```

801: In a radio resource control inactive RRC inactive state, transmit an RRC resume request and first uplink data to the first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state 802: Transmit, to the terminal device, a negative acknowledgment NACK transmitted for the RRC resume request and the first uplink data 803: Receive, by using a first receive beam, the NACK transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource 804: Retransmit the RRC resume request and the first uplink data to the first access network device through a second CG resource, where a transmit beam for retransmitting the RRC resume request and the first uplink data is the same as a transmit beam for previous uplink transmission

FIG. 8

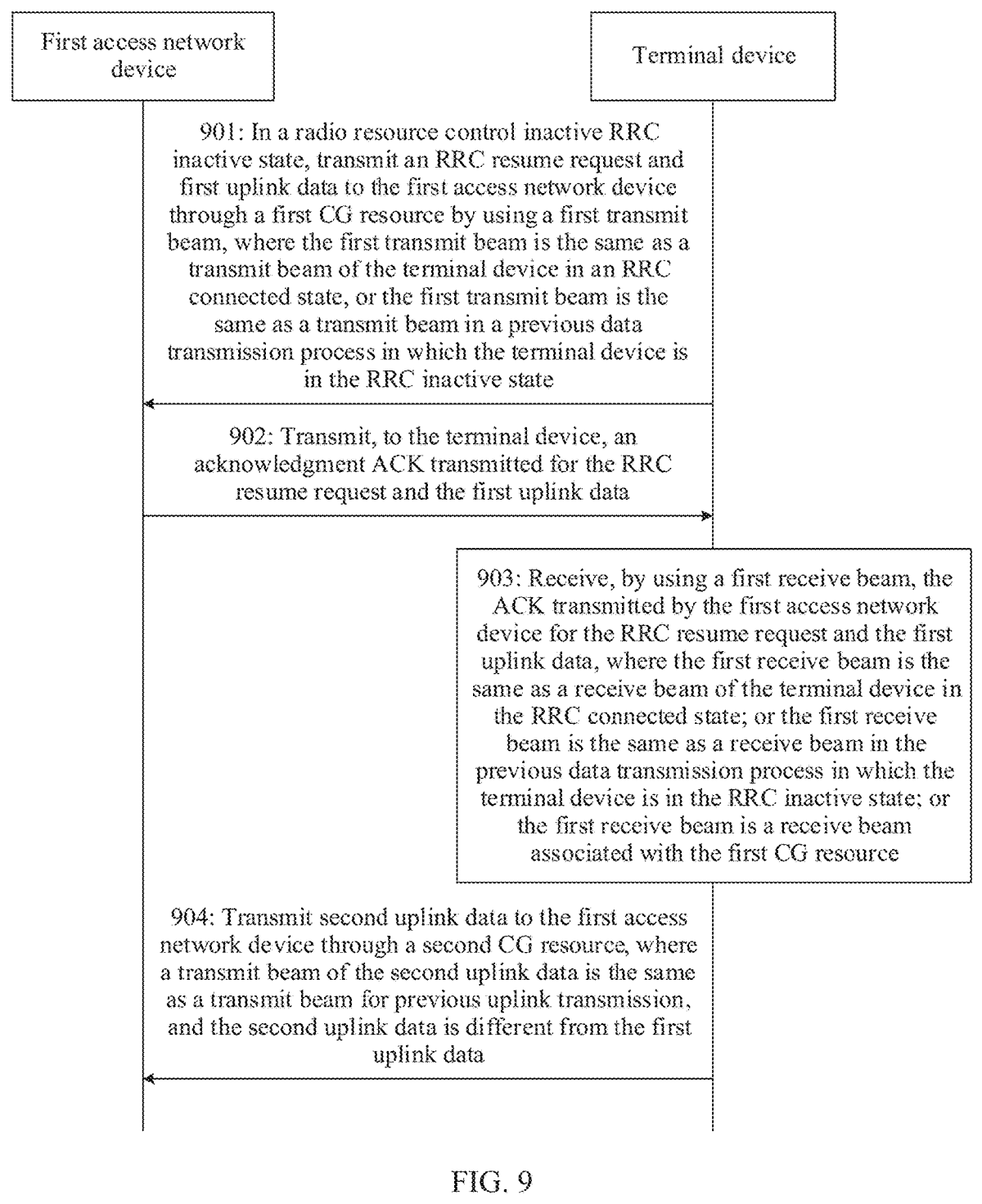

| First access network device | | Terminal device |
|---|---|---|

901: In a radio resource control inactive RRC inactive state, transmit an RRC resume request and first uplink data to the first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state 902: Transmit, to the terminal device, an acknowledgment ACK transmitted for the RRC resume request and the first uplink data 903: Receive, by using a first receive beam, the ACK transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource 904: Transmit second uplink data to the first access network device through a second CG resource, where a transmit beam of the second uplink data is the same as a transmit beam for previous uplink transmission, and the second uplink data is different from the first uplink data

FIG. 9

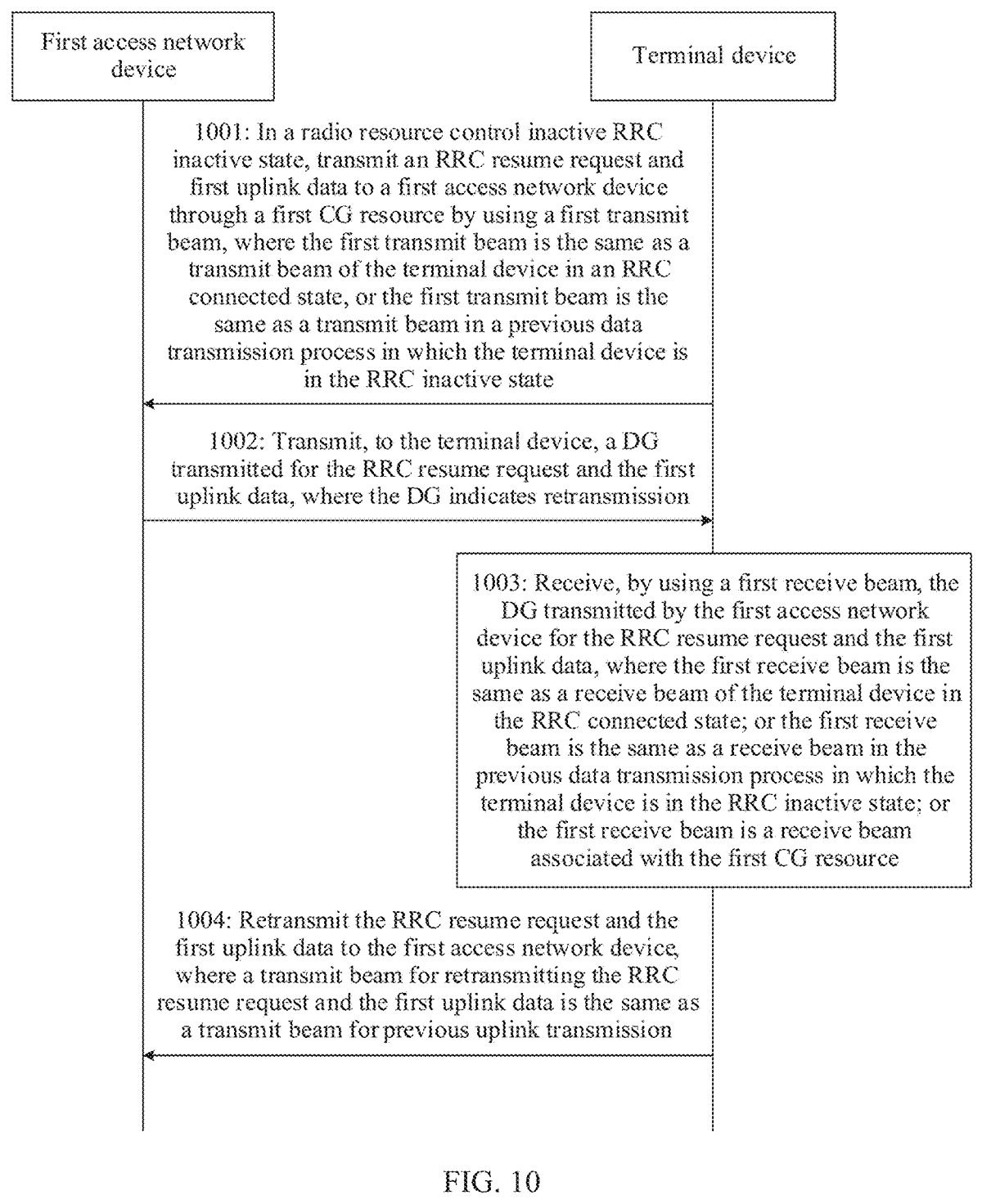

| First access network device | | Terminal device |
|---|---|---|

1001: In a radio resource control inactive RRC inactive state, transmit an RRC resume request and first uplink data to a first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state 1002: Transmit, to the terminal device, a DG transmitted for the RRC resume request and the first uplink data, where the DG indicates retransmission 1003: Receive, by using a first receive beam, the DG transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource 1004: Retransmit the RRC resume request and the first uplink data to the first access network device, where a transmit beam for retransmitting the RRC resume request and the first uplink data is the same as a transmit beam for previous uplink transmission

FIG. 10

```
┌─────────────────────┐                    ┌─────────────────────┐
│  First access network │                    │    Terminal device   │
│        device         │                    │                     │
└─────────────────────┘                    └─────────────────────┘
```

1101: In a radio resource control inactive RRC inactive state, transmit an RRC resume request and first uplink data to a first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state 1102: Transmit, to the terminal device, a DG transmitted for the RRC resume request and the first uplink data, where the DG indicates new transmission 1103: Receive, by using a first receive beam, the DG transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource 1104: Transmit second uplink data to the first access network device, where a transmit beam of the second uplink data is the same as a transmit beam for previous uplink transmission, and the second uplink data is different from the first uplink data

FIG. 11

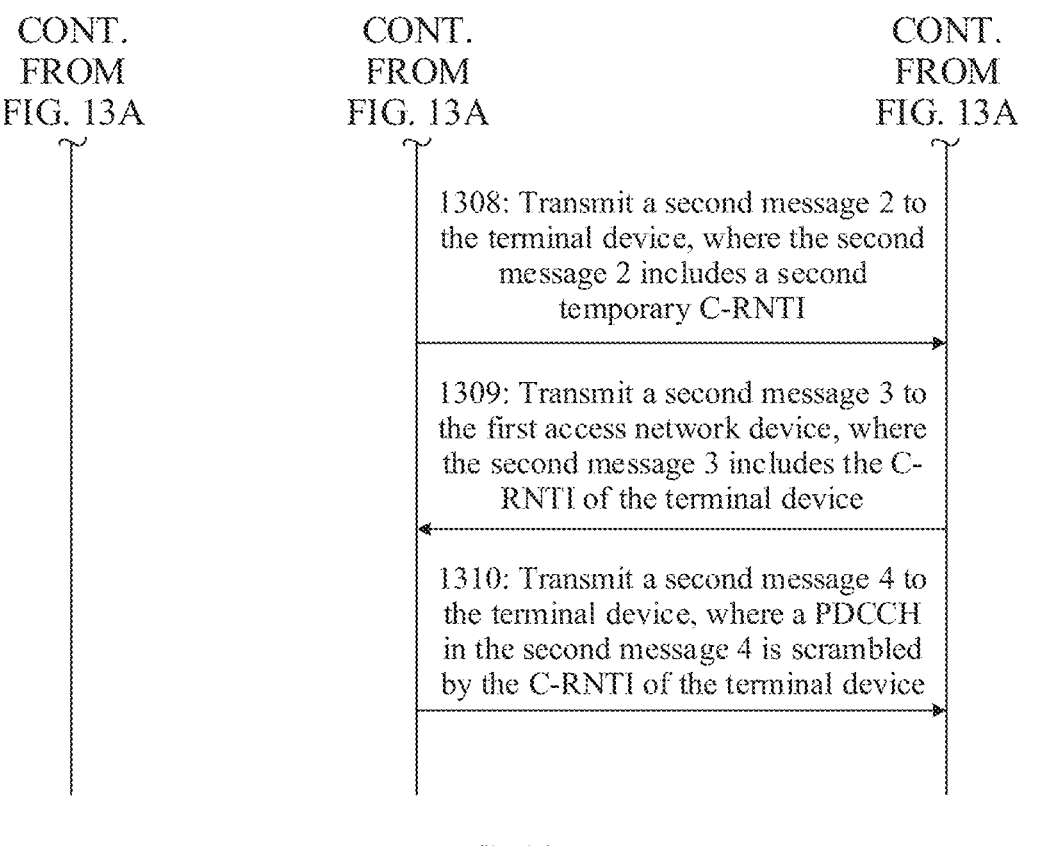

CONT.
FROM
FIG. 13A

CONT.
FROM
FIG. 13A

CONT.
FROM
FIG. 13A

1308: Transmit a second message 2 to the terminal device, where the second message 2 includes a second temporary C-RNTI 1309: Transmit a second message 3 to the first access network device, where the second message 3 includes the C-RNTI of the terminal device 1310: Transmit a second message 4 to the terminal device, where a PDCCH in the second message 4 is scrambled by the C-RNTI of the terminal device

FIG. 13B

First access network device

Terminal device

1401: The terminal device in an RRC inactive state transmits a second message A to the first access network device, where the second message A includes a second preamble and a C-RNTI of the terminal device 1402: Transmit a second message B to the terminal device, where a PDCCH in the second message B is scrambled by the C-RNTI of the terminal device

COMMUNICATION METHOD AND COMMUNICATION APPARATUS

CROSS-REFERENCE TO RELATED APPLICATIONS

This application is a continuation of International Application No. PCT/CN2021/072287, filed on Jan. 15, 2021, the disclosure of which is hereby incorporated by reference in its entirety.

TECHNICAL FIELD

This application relates to the field of communication technologies, and in particular, to a communication method and a communication apparatus.

BACKGROUND

A radio resource control inactive (RRC inactive) state is an RRC state in a 5th generation (5G) mobile communication technology. An objective of the radio resource control inactive state is to enable a terminal device to quickly restore a dedicated connection and enter an RRC connected state without performing initial access. In RRC inactive, the terminal device moves in a radio access network based notification area (RNA), and may not inform an access network device. The terminal device stores a context of the terminal device, and a previous-served access network device stores the context of the terminal device, and a next generation (NG) connection to an access and mobility management function (AMF) and a user plane function (UPF). A dedicated RRC connection between the terminal device and the access network device is suspended, and may be subsequently restored.

A signaling procedure of switching from an RRC idle state to an RRC connected state is actually an initial access process of the terminal device, and includes random access, RRC connection setup, initial context setup, an RRC reconfiguration process, a security mode configuration process, a context setup process, an authentication procedure, and the like. Comparing the signaling procedure with a signaling procedure from the RRC inactive state to the RRC connected state, it can be found that in the RRC inactive state, a lot of signaling interaction is reduced in an RRC resume procedure (for example, on a Uu interface, the RRC reconfiguration process and the security mode configuration process are reduced, on an NG interface, the context setup process and the authentication procedure are reduced, and the like). Because of the reduction of signaling interaction, switching from the RRC inactive state to the RRC connected state is faster than switching from the RRC idle state to the RRC connected state, thereby reducing an access delay.

Beam management is used to establish and maintain a group of suitable beam pairs. That is, a suitable transmit beam is selected at a transmitter and a suitable receive beam is selected at a receiver to form a group of beam pairs to maintain a good wireless connection. This process is called serving beam selection. Serving beam selection needs to be completed based on beam measurement of a reference signal. In some scenarios, an originally established beam pair may be blocked due to an environment change, and the access network device and the terminal device do not have enough time to perform beam adjustment. In this case, another group of beam pairs may be quickly selected and established through beam failure restoration.

Serving beam selection is to select and maintain a group of optimal beam pairs between a base station and UE through a set of procedures of beam scanning, beam measurement and reporting, and beam indication, and to transmit uplink and downlink signals. A location and a channel status of the terminal device may change as the terminal device moves in a network, and a corresponding optimal beam pair also changes. Therefore, after an initial serving beam is established, serving beam adjustment is continuously performed, to ensure that an optimal beam pair is always used for uplink and downlink signal transmission.

In a current 5G protocol version, beam management and beam failure restoration can be configured only in the RRC connected state. Beam management and beam failure restoration are not supported in the RRC inactive state. In other words, the terminal device can perform beam management and beam failure restoration only when the terminal device is in the RRC connected state. According to a current standard, data transmission can be performed in the RRC inactive state without entering the RRC connected state. Considering that a greatest advantage of the RRC inactive state is to save energy and power of the terminal device. If the beam management and the beam failure restoration are supported in the RRC inactive state, energy saving of the terminal device is unfavorable.

SUMMARY

This application provides a communication method and a communication apparatus, to help reduce power consumption of a terminal device when data transmission is performed in an RRC inactive state.

According to a first aspect, this application provides a communication method. The method includes: After successfully performing first random access in a radio resource control inactive RRC inactive state, a terminal device receives, by using a first receive beam, downlink control information DCI transmitted by an access network device, where the first receive beam is the same as a receive beam for downlink transmission of the first random access.

In the method described in the first aspect, the terminal device performs current transmission in the RRC inactive state by using a previously transmitted beam. In this way, the terminal device does not need to perform a series of operations such as beam measurement and measurement result reporting to determine the beam, thereby reducing power consumption of the terminal device.

In a possible implementation, the DCI indicates a downlink transmission resource or an uplink transmission resource. The terminal device may further perform downlink transmission through the downlink transmission resource, or may further perform uplink transmission through the uplink transmission resource by using a first transmit beam. A receive beam of the downlink transmission is the same as the first receive beam. The first transmit beam is the same as a transmit beam for uplink transmission of the first random access.

In this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

In a possible implementation, the first random access is four-step random access, and the first receive beam is the same as a receive beam of a message 2 or a message 4 in the first random access.

In a possible implementation, the first random access is two-step random access, and the first receive beam is the same as a receive beam of a message B in the first random access.

In a possible implementation, the first random access is four-step random access, and the first transmit beam is the same as a transmit beam of a message 1 or a message 3 in the first random access.

In a possible implementation, the first random access is two-step random access, and the first transmit beam is the same as a transmit beam of a message A in the first random access.

In a possible implementation, the terminal device may further receive indication information transmitted by the access network device. When the indication information indicates to monitor a physical downlink control channel PDCCH corresponding to a cell radio network temporary identifier C-RNTI, the terminal device monitors the PDCCH corresponding to the C-RNTI, and the DCI is carried on the PDCCH corresponding to the C-RNTI. The C-RNTI is a C-RNTI of the terminal device. When the indication information indicates not to monitor the PDCCH corresponding to the C-RNTI, the terminal device does not monitor the PDCCH corresponding to the C-RNTI.

Based on this possible implementation, the access network device may indicate the terminal device to monitor the PDCCH corresponding to the C-RNTI only when the terminal device has a data transmission requirement, and indicate the terminal device not to monitor the PDCCH corresponding to the C-RNTI when the terminal device has no data transmission requirement. This helps reduce the power consumption of the terminal device.

In another possible implementation, the terminal device may alternatively monitor, by default, the PDCCH corresponding to the C-RNTI.

In a possible implementation, the first random access is the four-step random access, and the indication information is carried in the message 4 of the first random access; or the first random access is the two-step random access, and the indication information is carried in the message B of the first random access. Based on this possible implementation, the indication information can be carried in an existing message, and no new message is added to carry the indication information. This facilitates implementation.

In a possible implementation, when the indication information is a first RRC release message, and the first RRC release message does not carry a next hop chain counter NCC indication, an inactive-radio network temporary identifier I-RNTI, or a pause configuration, it indicates to monitor the PDCCH corresponding to the C-RNTI, and the pause configuration indicates the terminal device to stay in the RRC inactive state.

Based on this possible implementation, whether the terminal device monitors the PDCCH corresponding to the C-RNTI may be indicated in an implicit manner. In this way, no new signaling is required to indicate the terminal device whether to monitor the PDCCH corresponding to the C-RNTI, thereby reducing transmission resources.

In another possible implementation, the indication information may alternatively indicate, in an explicit manner, whether the terminal device monitors the PDCCH corresponding to the C-RNTI.

In a possible implementation, when a first condition is met, the terminal device stops monitoring a PDCCH corresponding to a C-RNTI, where the DCI is carried on the PDCCH corresponding to the C-RNTI. The first condition is one of the following conditions: beam failure occurs and a timer expires. The timer is used to control the terminal device to monitor the PDCCH of the C-RNTI. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2.

Based on this possible implementation, when beam failure occurs on the first receive beam or there is a high probability that signal received quality of the first receive beam is already poor, monitoring for the PDCCH corresponding to the C-RNTI can be stopped in a timely manner, to reduce the power consumption of the terminal device.

In a possible implementation, when the first condition is met, the terminal device stops monitoring the PDCCH corresponding to the C-RNTI, where the DCI is carried on the PDCCH corresponding to the C-RNTI. The first condition is one of the following conditions: beam failure occurs and a timer expires. The timer is used to control the terminal device to monitor the PDCCH of the C-RNTI, or the timer is used to control validity of a transmit beam. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2; or a reference signal received power RSRP of a receive beam corresponding to the first transmit beam is less than a second threshold; or N consecutive RSRPs of a receive beam corresponding to the first transmit beam are less than a second threshold, where N is an integer greater than or equal to 2; or in a first time period, N consecutive RSRPs of a receive beam corresponding to the first transmit beam are less than a second threshold, where N is an integer greater than or equal to 2.

Based on this possible implementation, when beam failure occurs on the first receive beam or there is a high probability that signal received quality of the first receive beam is already poor, monitoring for the PDCCH corresponding to the C-RNTI can be stopped in a timely manner, to reduce the power consumption of the terminal device. Alternatively, based on this possible implementation, when beam failure occurs on the first transmit beam or the first transmit beam is invalid, monitoring for the PDCCH corresponding to the C-RNTI can be stopped in a timely manner, to reduce the power consumption of the terminal device.

In a possible implementation, when the first condition is met, the terminal device performs second random access. When the foregoing first condition is met, the terminal device may update a beam in time by performing the second random access.

In a first possible implementation, the timer is started or restarted after the message 4 of the random access is received.

In a second possible implementation, the timer is started or restarted after the message B of the random access is received.

In a third possible implementation, the timer is started or restarted after DCI corresponding to the C-RNTI is received. In this embodiment of this application, the DCI corresponding to the C-RNTI is the DCI transmitted to the terminal device.

In a fourth possible implementation, the timer is started or restarted after the terminal device performs transmission based on a transmission resource indicated by DCI corresponding to the C-RNTI.

In a possible implementation, the terminal device may further receive second indication information transmitted by the access network device, where the second indication information indicates duration of the timer. Based on this possible implementation, the duration of the timer can be flexibly controlled. Alternatively, the duration of the timer may be specified in advance in a protocol.

In a possible implementation, the first random access and the second random access are four-step random access. A message 2 of the first random access includes a first temporary C-RNTI. A message 3 of the second random access carries the C-RNTI of the terminal device, and the C-RNTI of the terminal device is the same as the first temporary C-RNTI. A PDCCH in a message 4 of the second random access is scrambled by using the C-RNTI of the terminal device.

In this possible implementation, the C-RNTI of the terminal device is the first temporary C-RNTI in the current data transmission process. In this way, the access network device may transmit the C-RNTI (namely, the first temporary C-RNTI) to a second access network device (namely, a last serving gNB) only once in the current data transmission process. In this way, a potential risk of security misalignment can be avoided, and signaling interaction between two access network devices can be reduced.

In a possible implementation, the first random access and the second random access are two-step random access. A message B of the first random access includes a first C-RNTI. A message A of the second random access carries the C-RNTI of the terminal device, and the C-RNTI of the terminal device is the same as the first C-RNTI. A PDCCH in a message B of the second random access is scrambled by using the C-RNTI of the terminal device.

In this possible implementation, the C-RNTI of the terminal device is the first C-RNTI in the message B of the first random access. In this way, the access network device may transmit the C-RNTI (namely, the first C-RNTI) to a second access network device (namely, a last serving gNB) only once in the current data transmission process. This helps avoid a potential risk of security misalignment and reduce signaling interaction between two access network devices.

In a possible implementation, the first receive beam corresponds to a first preamble; or the first receive beam corresponds to a time-frequency resource of a first preamble. The first random access is the four-step random access, and the first preamble is a preamble in the message 1 of the first random access; or the first random access is the two-step random access, and the first preamble is a preamble in the message A of the first random access. The first preamble corresponds to a first SSB, or the time-frequency resource of the first preamble corresponds to a first SSB. The first receive beam, a receive beam of the first random access, and a receive beam of the first SSB are the same. Performing downlink transmission by using a beam that is the same as the receive beam of the first SSB helps improve signal received quality of the terminal device.

In a possible implementation, the DCI indicates the downlink transmission resource. The terminal device may further transmit a hybrid automatic repeat request HARQ feedback to the access network device, where a transmit beam of the HARQ feedback is the same as the first transmit beam. Based on this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

In a possible implementation, the DCI indicates the uplink transmission resource. The terminal device may further receive a hybrid automatic repeat request HARQ feedback transmitted by the access network device, where a receive beam of the HARQ feedback is the same as the first receive beam. Based on this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

According to a second aspect, this application provides a communication method. The method includes: In a radio resource control inactive RRC inactive state, a terminal device transmits an RRC resume request and first uplink data to an access network device through a first configured grant CG resource by using a first transmit beam. The first transmit beam is the same as a transmit beam of the terminal device in an RRC connected state, or the first transmit beam is the same as a transmit beam in a previous data transmission process in which the terminal device is in the RRC inactive state.

In the method described in the second aspect, the terminal device performs current transmission in the RRC inactive state by using a previously transmitted beam. In this way, the terminal device does not need to perform a series of operations such as beam measurement and measurement result reporting to determine the beam, thereby reducing power consumption of the terminal device.

In a possible implementation, the terminal device may further receive, by using a first receive beam, a first response transmitted by the access network device for the RRC resume request and the first uplink data. The first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

Based on this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

In a possible implementation, the first response is a first hybrid automatic repeat request HARQ feedback. If the HARQ feedback is a negative acknowledgment NACK, the terminal device may further retransmit the RRC resume request and the first uplink data to the access network device through a second CG resource. A transmit beam for retransmitting the RRC resume request and the first uplink data is the same as a transmit beam for previous uplink transmission.

Based on this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

In a possible implementation, the first response is the first hybrid automatic repeat request HARQ feedback. If the HARQ feedback is an acknowledgment ACK, the terminal device may further transmit second uplink data to the access network device through the second CG resource. A transmit beam of the second uplink data is the same as the transmit beam for the previous uplink transmission, and the second uplink data is different from the first uplink data.

Based on this possible implementation, the terminal device performs current transmission in the RRC inactive state by using the previously transmitted beam. In this way, the terminal device does not need to perform the series of operations such as beam measurement and measurement result reporting to determine the beam, thereby reducing the power consumption of the terminal device.

In a possible implementation, the first response is a dynamic grant DG. If the DG indicates retransmission, the terminal device may further retransmit the RRC resume request and the first uplink data to the access network device, where a transmit beam for retransmitting the RRC resume request and the first uplink data is the same as a transmit beam for previous uplink transmission. If the DG indicates new transmission, the terminal device may further transmit second uplink data to the access network device, where a transmit beam of the second uplink data is the same as a transmit beam for previous uplink transmission. The second uplink data is different from the first uplink data.

Based on this possible implementation, the terminal device performs retransmission or new transmission in the RRC inactive state by using a previously transmitted beam. In this way, the terminal device does not need to perform a series of operations such as beam measurement and measurement result reporting to determine a transmit beam used for retransmission or new transmission, thereby reducing the power consumption of the terminal device.

In a possible implementation, the terminal device receives indication information transmitted by the access network device. If the indication information indicates that a beam that is the same as the transmit beam for the previous uplink transmission is used to perform uplink transmission, the terminal device may perform uplink transmission in subsequent uplink transmission by using the beam that is the same as the transmit beam for the previous uplink transmission. For example, after the first response is received, the RRC resume request and the first uplink data are retransmitted, or the second uplink data is newly transmitted, and transmission may be performed by using the beam that is the same as the transmit beam for the previous uplink transmission.

If the indication information indicates that a beam that is the same as a transmit beam for previous uplink transmission is not used to perform uplink transmission, the terminal device may not perform uplink transmission in subsequent uplink transmission by using the beam that is the same as the transmit beam for the previous uplink transmission. For example, the first response is a first hybrid automatic repeat request HARQ feedback. If the HARQ feedback is a negative acknowledgment NACK, the terminal device may retransmit the RRC resume request and the first uplink data to the access network device through a second CG resource. A transmit beam for retransmitting the RRC resume request and the first uplink data is different from a transmit beam for previous uplink transmission. For another example, the first response is the first hybrid automatic repeat request HARQ feedback. If the HARQ feedback is an acknowledgment ACK, the terminal device may transmit second uplink data to the access network device through the second CG resource. A transmit beam of the second uplink data is the same as the transmit beam for the previous uplink transmission, and the second uplink data is different from the first uplink data. For another example, the first response is a dynamic grant DG. If the DG indicates retransmission, the terminal device may retransmit the RRC resume request and the first uplink data to the access network device, where a transmit beam for retransmitting the RRC resume request and the first uplink data is different from a transmit beam for previous uplink transmission. If the DG indicates new transmission, the terminal device may transmit second uplink data to the access network device, where a transmit beam of the second uplink data is different from a transmit beam for previous uplink transmission. The second uplink data is different from the first uplink data.

It can be learned that, based on this possible implementation, the access network device may flexibly control a beam used by the terminal device.

In a possible implementation, the terminal device monitors a physical downlink control channel PDCCH corresponding to a cell radio network temporary identifier C-RNTI or a configured scheduling radio network temporary identifier CS-RNTI. The PDCCH carries the first response or carries downlink control information DCI indicating a transmission resource for the first response, and the C-RNTI or the CS-RNTI is a C-RNTI or a CS-RNTI of the terminal device. When a first condition is met, the terminal device stops monitoring the PDCCH corresponding to the C-RNTI or the CS-RNTI.

The first condition includes any one of the following conditions: beam failure occurs and a timer expires. The timer is used to control the terminal device to monitor the PDCCH of the C-RNTI or the CS-RNTI, or the timer is used to control validity of a transmit beam. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2; or a reference signal received power RSRP of a receive beam corresponding to the first transmit beam is less than a second threshold; or N consecutive RSRPs of a receive beam corresponding to the first transmit beam are less than a second threshold, where N is an integer greater than or equal to 2; or in a first time period, N consecutive RSRPs of a receive beam corresponding to the first transmit beam are less than a second threshold, where N is an integer greater than or equal to 2.

Based on this possible implementation, when beam failure occurs on the first receive beam or there is a high probability that signal received quality of the first receive beam is already poor, monitoring for the PDCCH corresponding to the C-RNTI can be stopped in a timely manner, to reduce the power consumption of the terminal device. Alternatively, based on this possible implementation, when beam failure occurs on the first transmit beam or the first transmit beam is invalid, monitoring for the PDCCH corresponding to the C-RNTI can be stopped in a timely manner, to reduce the power consumption of the terminal device.

In a possible implementation, when the first condition is met, the terminal device performs random access. When the foregoing first condition is met, the terminal device may update a beam in time by performing the random access.

In a possible implementation, the timer is started or restarted after the PDCCH of the C-RNTI is received. Alternatively, the timer is started or restarted after the terminal device performs data transmission based on a CG resource.

In a possible implementation, the terminal device may further receive second indication information transmitted by the access network device, where the second indication information indicates duration of the timer. Based on this possible implementation, the duration of the timer can be flexibly controlled. Alternatively, the duration of the timer may be specified in advance in a protocol.

In a possible implementation, the random access is four-step random access. A message 3 of the random access carries a C-RNTI of the terminal device. A PDCCH in a message 4 of the random access is scrambled by using the C-RNTI of the terminal device. In this possible implementation, the C-RNTI of the terminal device remains unchanged in a current data transmission process. In this way, the access network device may transmit the C-RNTI to a second access network device (namely, a last serving gNB) only once in the current data transmission process. In this way, a potential risk of security misalignment can be avoided, and signaling interaction between two access network devices can be reduced.

In a possible implementation, the random access is two-step random access. A message A of the random access includes a C-RNTI of the terminal device. A PDCCH in a message B of the random access is scrambled by using the C-RNTI of the terminal device. In this possible implementation, the C-RNTI of the terminal device remains unchanged in a current data transmission process. In this way, the access network device may transmit the C-RNTI to a second access network device (namely, a last serving gNB) only once in the current data transmission process. In this way, a potential risk of security misalignment can be avoided, and signaling interaction between two access network devices can be reduced.

According to a third aspect, this application provides a communication method. The method includes: A first access network device receives a second message 1 transmitted by a terminal device in a radio resource control inactive RRC inactive state, where the second message 1 includes a second preamble. The first access network device transmits a second message 2 to the terminal device, where the second message 2 includes a second temporary cell radio network temporary identifier C-RNTI. The first access network device receives a second message 3 transmitted by the terminal device, where the second message 3 includes a C-RNTI of the terminal device. The first access network device transmits a second message 4 to the terminal device, where a PDCCH in the second message 4 is scrambled by the C-RNTI of the terminal device.

Based on the method described in the third aspect, the C-RNTI of the terminal device remains unchanged in a current data transmission process. In this way, the first access network device may transmit the C-RNTI to a second access network device (namely, a last serving gNB) only once in the current data transmission process. In this way, a potential risk of security misalignment can be avoided, and signaling interaction between two access network devices can be reduced.

Optionally, the second temporary C-RNTI is used for retransmission scheduling of the second MSG3.

In a possible implementation, before the first access network device receives the second message 1 transmitted by the terminal device in the radio resource control inactive RRC inactive state, the first access network device receives a first message 1 transmitted by the terminal device in the radio resource control inactive RRC inactive state, where the first message 1 includes a first preamble. The first access network device transmits a first message 2 to the terminal device, where the first message 2 includes a first temporary C-RNTI. The first access network device receives a first message 3 transmitted by the terminal device, where the first message 3 includes a radio resource control RRC resume request and first uplink data. The first access network device transmits a first message 4 to the terminal device, where the first message 4 includes contention resolution. The first access network device transmits the first temporary C-RNTI to the second access network device, where the C-RNTI of the terminal device is the first temporary C-RNTI.

In this possible implementation, the C-RNTI of the terminal device is the first temporary C-RNTI in the current data transmission process. In this way, the first access network device may transmit the C-RNTI (namely, the first temporary C-RNTI) to the second access network device (namely, a last serving gNB) only once in the current data transmission process. In this way, a potential risk of security misalignment can be avoided, and signaling interaction between two access network devices can be reduced.

According to a fourth aspect, this application provides a communication method. The method includes: A first access network device receives a second message A transmitted by a terminal device in a radio resource control inactive RRC inactive state, where the second message A includes a second preamble and a cell radio network temporary identifier C-RNTI of the terminal device. The first access network device transmits a second message B to the terminal device, where a PDCCH in the second message B is scrambled by the C-RNTI of the terminal device.

Based on the method described in the fourth aspect, the C-RNTI of the terminal device remains unchanged in a current data transmission process. In this way, the access network device may transmit the C-RNTI to a second access network device (namely, a last serving gNB) only once in the current data transmission process. In this way, a potential risk of security misalignment can be avoided, and signaling interaction between two access network devices can be reduced.

In a possible implementation, before the first access network device receives the second message A transmitted by the terminal device in the radio resource control inactive RRC inactive state, the first access network device receives a first message A transmitted by the terminal device in the radio resource control inactive RRC inactive state, where the first message A includes a first preamble, a radio resource control RRC resume request, and first uplink data. The first access network device transmits a first message B to the terminal device, where the first message B includes contention resolution and a first C-RNTI. The first access network device transmits the first C-RNTI to the second access network device, where the C-RNTI of the terminal device is the first C-RNTI.

In this possible implementation, the C-RNTI of the terminal device is the first C-RNTI in the message B of first random access. In this way, the first access network device may transmit the C-RNTI (namely, the first C-RNTI) to the second access network device (namely, a last serving gNB)

only once in the current data transmission process. This helps avoid a potential risk of security misalignment and reduce signaling interaction between two access network devices.

According to a fifth aspect, this application provides a communication method. The method includes: A terminal device receives second information transmitted by a network device, where the second information is used to notify the terminal device to restore an SCG. The terminal device restores or activates the SCG. If a timing advance timer does not expire or is not stopped or canceled, the terminal device transmits a PUCCH or a PUSCH to the SCG, where transmit beams of the PUCCH and the PUSCH are the same as a transmit beam for previous uplink transmission, or the terminal device monitors a PDCCH of the SCG. A receive beam for monitoring the PDCCH of the SCG is the same as a receive beam for monitoring the PDCCH in the SCG last time.

In the method described in the fifth aspect, the terminal device performs transmission to the SCG by using a previously transmitted beam. In this way, the terminal device does not need to perform a series of operations such as beam measurement and measurement result reporting to determine the beam, thereby reducing power consumption of the terminal device.

According to a sixth aspect, this application provides a communication apparatus. The apparatus may be a terminal device, an apparatus in a terminal device, or an apparatus that can be used together with a terminal device. The communication apparatus may alternatively be a chip system. The communication apparatus may perform the method according to the first aspect, the second aspect, or the fifth aspect. A function of the communication apparatus may be implemented by hardware, or may be implemented by executing corresponding software by hardware. The hardware or software includes one or more units or modules corresponding to the foregoing function. The unit or module may be software and/or hardware. For operations performed by the communication apparatus and beneficial effect thereof, refer to the method in the first aspect, the second aspect, or the fifth aspect, and beneficial effect thereof. Repeated content is not described again.

According to a seventh aspect, this application provides a communication apparatus. The apparatus may be a first access network device, an apparatus in a first access network device, or an apparatus that can be used together with a first access network device. The communication apparatus may alternatively be a chip system. The communication apparatus may perform the method according to the third aspect or the fourth aspect. A function of the communication apparatus may be implemented by hardware, or may be implemented by executing corresponding software by hardware. The hardware or software includes one or more units or modules corresponding to the foregoing function. The unit or module may be software and/or hardware. For operations performed by the communication apparatus and beneficial effect thereof, refer to the method according to the third aspect or the fourth aspect, and the beneficial effect thereof. Repeated content is not described again.

According to an eighth aspect, this application provides a communication apparatus. The communication apparatus includes a processor. When the processor invokes a computer program in a memory, the method according to any one of the first aspect to the fifth aspect is performed.

According to a ninth aspect, this application provides a communication apparatus. The communication apparatus includes a processor and a memory, and the processor and the memory are coupled. The processor is configured to implement the method according to any one of the first aspect to the fifth aspect.

According to a tenth aspect, this application provides a communication apparatus. The communication apparatus includes a processor and an interface circuit. The interface circuit is configured to: receive a signal from another communication apparatus other than the communication apparatus and transmit the signal to the processor, or transmit a signal from the processor to another communication apparatus other than the communication apparatus. The processor is configured to implement the method according to any one of the first aspect to the fifth aspect by using a logic circuit or by executing code instructions.

According to an eleventh aspect, this application provides a computer-readable storage medium. The storage medium stores computer programs or instructions, and when the computer programs or the instructions are executed by a communication apparatus, the method according to any one of the first aspect to the fifth aspect is implemented.

According to a twelfth aspect, this application provides a computer program product including instructions. When a computer reads and executes the computer program product, the computer is enabled to perform the method according to any one of the first aspect to the fifth aspect.

BRIEF DESCRIPTION OF DRAWINGS

FIG. 5 is another schematic flowchart of first random access according to an embodiment of this application;

FIG. 6 is a schematic flowchart of another communication method according to an embodiment of this application;

FIG. 7 is a schematic flowchart of still another communication method according to an embodiment of this application;

FIG. 8 is a schematic flowchart of still another communication method according to an embodiment of this application;

FIG. 9 is a schematic flowchart of still another communication method according to an embodiment of this application;

FIG. 10 is a schematic flowchart of still another communication method according to an embodiment of this application;

FIG. 11 is a schematic flowchart of still another communication method according to an embodiment of this application;

FIG. 13A and FIG. 13B are a schematic flowchart of still another communication method according to an embodiment of this application;

FIG. 14 is a schematic flowchart of still another communication method according to an embodiment of this application;

DESCRIPTION OF EMBODIMENTS

Figure 1:
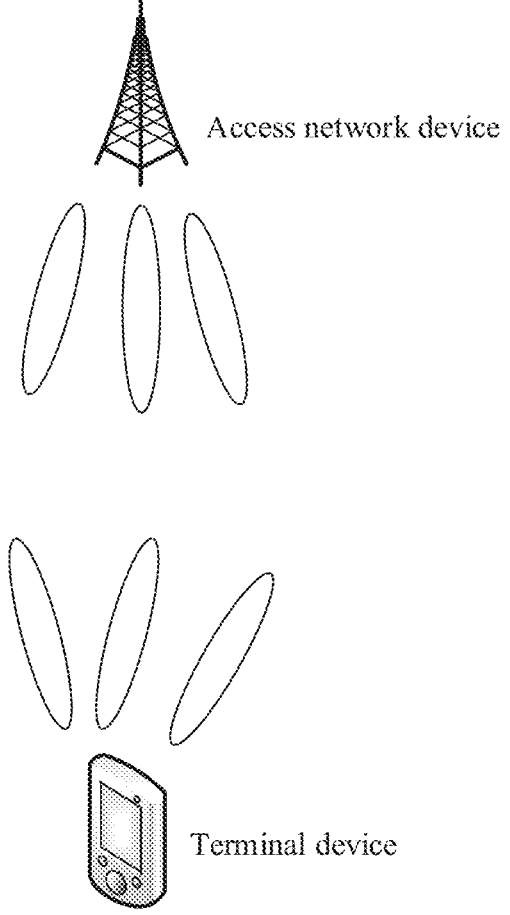
FIG. 1 is a schematic diagram of a system architecture according to an embodiment of this application.

The following further describes specific embodiments of this application in detail with reference to accompanying drawings.

In the specification, the claims, and the accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a specific feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

To reduce power consumption of a terminal device when data is transmitted in an RRC inactive state, embodiments of this application provide a communication method and a communication apparatus. To better understand the solutions provided in this application, the following first describes technical terms in this application (RRC states of three types of terminal devices):

1. Radio resource control connected (RRC connected) state: In the RRC connected state, there is a dedicated RRC connection between a terminal device and an access network device. This dedicated RRC connection is a connection of a data radio bearer (DRB) or a signaling radio bearer 1 (SRB1).

2. Radio resource control idle (RRC idle) state: In the RRC idle state, there is no dedicated RRC connection between a terminal device and an access network device.

3. Radio resource control inactive (RRC inactive) state: In the RRC inactive state, a dedicated RRC connection between a terminal device and an access network device is suspended. Similar to an RRC idle state, in the RRC inactive state, the terminal device can receive only content (paging and broadcast) in common search space, and may perform cell reselection. In addition, cell reselection in the RRC inactive state is the same as that in the RRC idle state. In the RRC inactive state, the terminal device moves in a radio access network based notification area (RNA), and may not inform the access network device. A power consumption level similar to that of the RRC idle state may be obtained in the RRC inactive state, because the terminal device in the RRC inactive state suspends data processing. The terminal device stores a context of the terminal device, and a previous-served access network device stores the context of the terminal device, and an NG connection associated with an access and mobility management function (AMF) and a user plane function (UPF). The dedicated RRC connection between the terminal device and the access network device is suspended, and may be subsequently restored. The terminal device in the RRC inactive state may have a low data transmission restoration delay because the terminal device in the RRC inactive state can quickly switch to the RRC connected state by using an RRC resume procedure.

The following describes a system architecture in an embodiment of this application.

FIG. 1 is a schematic diagram of a system architecture according to an embodiment of this application. As shown in FIG. 1, the system architecture includes a terminal device and an access network device. In FIG. 1, one terminal device and one access network device are used as an example. The system architecture may further include a plurality of terminal devices or a plurality of access network devices.

1. Terminal Device

The terminal device may also be referred to as user equipment (UE), and includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include a wireless terminal device, a mobile terminal device, a device-to-device (D2D) terminal device, a vehicle-to-everything (V2X) terminal device, a machine-to-machine/machine-type communication (M2M/MTC) terminal device, an Internet of things (IoT) terminal device, a subscriber unit, a subscriber station, a mobile station, a remote station, an access point (AP), a remote terminal, an access terminal, a user terminal, a user agent, user equipment, or the like. For example, the terminal device may include a mobile phone (or referred to as a "cellular" phone), a computer with a mobile terminal device, or a portable, pocket-sized, hand-held, or computer built-in mobile apparatus. For example, it may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

In embodiments of this application, an apparatus configured to implement a function of the terminal device may be a terminal device, or may be an apparatus that can support the terminal device in implementing the function, for example, a chip system, or a combined component or device that can implement the function of the terminal device. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which an apparatus configured to implement a function of a terminal is a terminal device.

2. Access Network Device

The access network device is a node or a device that connects a terminal device to a radio network, and the access network device may also be referred to as a base station. The access network device includes, for example, but is not limited to, a next-generation NodeB (generation NodeB, gNB), an evolved NodeB (eNB), a radio network controller (RNC), a NodeB (NB), a base station controller (BSC), a base transceiver station (BTS), a home base station ((home evolved NodeB, HeNB) or (home NodeB, HNB)), a base-band unit (BBU), a transmission reception point (TRP), a transmission point (TP), or a mobile switching center in a 5G communication system.

In embodiments of this application, an apparatus configured to implement a function of the access network device may be an access network device, or may be an apparatus that can support the access network device in implementing the function, for example, a chip system, or a combined component or device that can implement the function of the access network device. The apparatus may be installed in the access network device. In the technical solutions provided in embodiments of this application, the technical solutions provided in embodiments of this application are described by using an example in which an apparatus configured to implement a function of an access network device is an access network device.

An interface between the access network device and the terminal device may be a Uu interface (or referred to as an air interface). Certainly, in future communication, names of these interfaces may remain unchanged, or may be replaced with other names. This is not limited in this application. For example, communication between the access network device and the terminal device complies with a specific protocol layer structure. For example, a control plane protocol layer structure may include an RRC layer, a packet data convergence protocol (PDCP) layer, a radio link control (RLC) layer, a media access control (MAC) layer, and a physical layer. A user plane protocol layer structure may include a PDCP layer, an RLC layer, a MAC layer, and a physical layer. In a possible implementation, a service data adaptation protocol (SDAP) layer may be further included above the PDCP layer.

The access network device may implement functions of the protocol layers such as the RRC layer, the PDCP layer, the RLC layer, and the MAC layer through one node or a plurality of nodes. For example, in an evolved structure, the access network device may include one or more centralized units (CUs) and one or more distributed units (DUs), and a plurality of DUs may be centrally controlled by one CU. For example, an interface between the CU and the DU may be referred to as an F1 interface. A control plane (CP) interface may be an F1-C interface, and a user plane (UP) interface may be F1-U. The CU and the DU may be obtained through division based on protocol layers of a wireless network. For example, as shown in FIG. 2a, functions of a PDCP layer and a protocol layer above the PDCP layer are set on the CU, and functions of protocol layers (for example, an RLC layer and a MAC layer) below the PDCP layer are set on the DU.

It may be understood that, division of processing functions of the CU and the DU based on the protocol layers is merely an example, and the processing functions may alternatively be divided in another manner. For example, functions of the protocol layers above the RLC layer are set on the CU, and functions of the RLC layer and the protocol layers below the RLC layer are set on the DU. For another example, the CU or the DU may be further divided into functions having more protocol layers. For another example, the CU or the DU may be further divided into some processing functions having protocol layers. In a design, some functions of the RLC layer and functions of the protocol layers above the RLC layer are set on the CU, and remaining functions of the RLC layer and functions of the protocol layers below the RLC layer are set on the DU. In another design, division of functions of the CU or the DU may alternatively be performed based on service types or other system requirements. For example, division may be performed based on delays. Functions whose processing time needs to satisfy a delay requirement are set on the DU, and functions whose processing time does not need to satisfy the delay requirement are set on the CU. In another design, the CU may alternatively have one or more functions of the core network. For example, the CU may be set on a network side for ease of centralized management; and the DU may have a plurality of radio frequency functions, or radio frequency functions may be set remotely. This is not limited in embodiments of this application.

For example, the functions of the CU may be implemented by one entity or different entities. For example, as shown in FIG. 2b, the functions of the CU may be further divided, to be specific, a control plane and a user plane are split, and are implemented by using different entities: a control plane CU entity (namely, a CU-CP entity) and a user plane CU entity (namely, a CU-UP entity). The CU-CP entity and the CU-UP entity may be coupled to the DU, to jointly complete the function of the access network device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

Figure 2A:
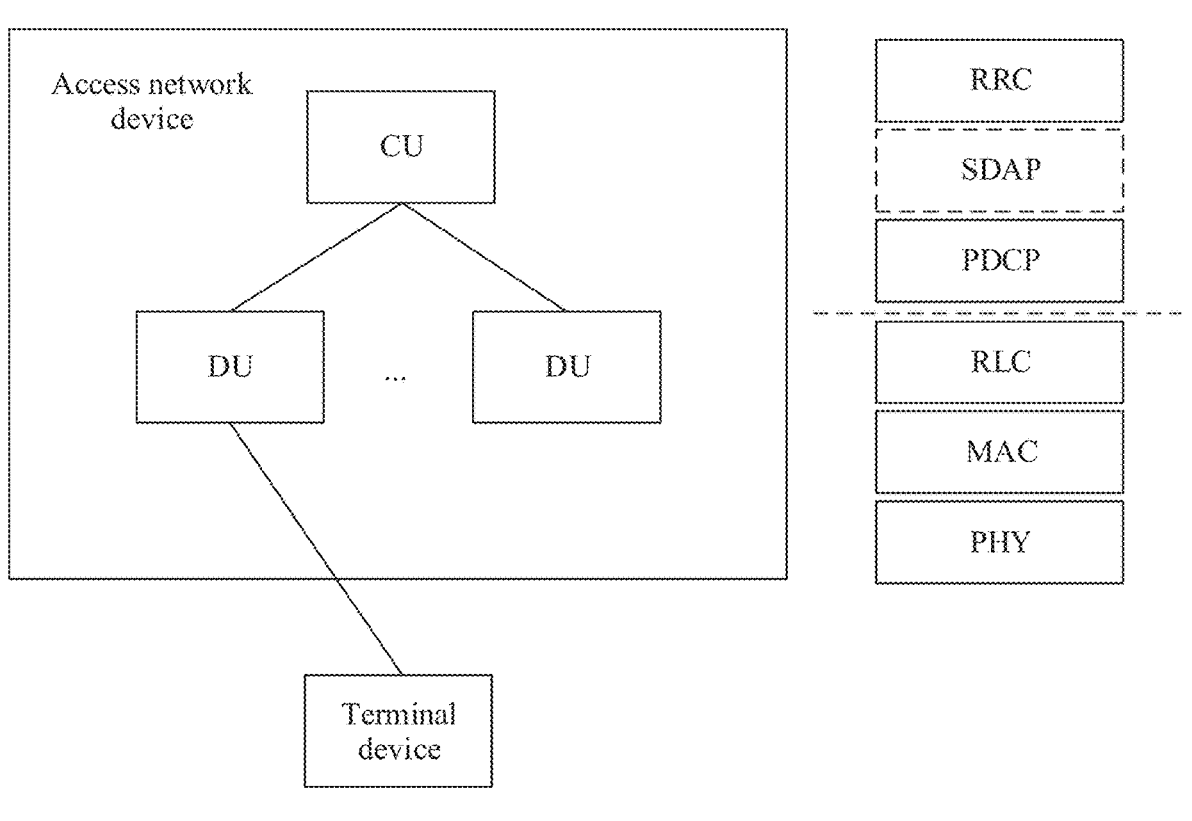
FIG. 2a is a schematic diagram of another system architecture according to an embodiment of this application.
Figure 2B:
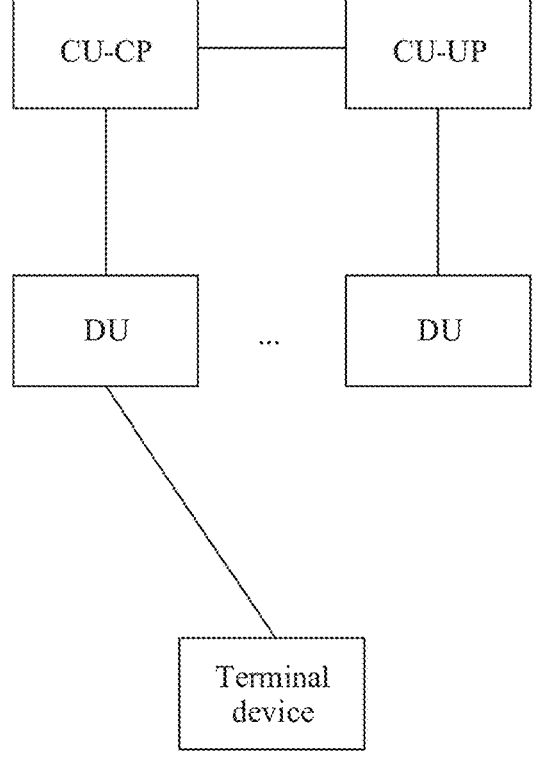
FIG. 2b is a schematic diagram of still another system architecture according to an embodiment of this application.

It should be noted that, in the architectures shown in FIG. 2*a* and FIG. 2*b*, signaling generated by the CU may be transmitted to the terminal device via the DU, or signaling generated by the terminal device may be transmitted to the CU via the DU. The DU may transparently transmit the signaling to the terminal device or the CU by directly encapsulating the signaling at a protocol layer without parsing the signaling. In the following embodiments, if transmission of such signaling between the DU and the terminal device is included, transmitting or receiving of the signaling by the DU includes this scenario. For example, signaling at the RRC layer or the PDCP layer is finally processed as data at the physical layer and transmitted to the terminal device, or is converted from received data at the physical layer. In this architecture, it may also be considered that the signaling at the RRC layer or the PDCP layer is transmitted by the DU, or transmitted by the DU and the radio frequency apparatus.

The following describes in detail the communication method and the communication apparatus provided in this application.

Figure 3:
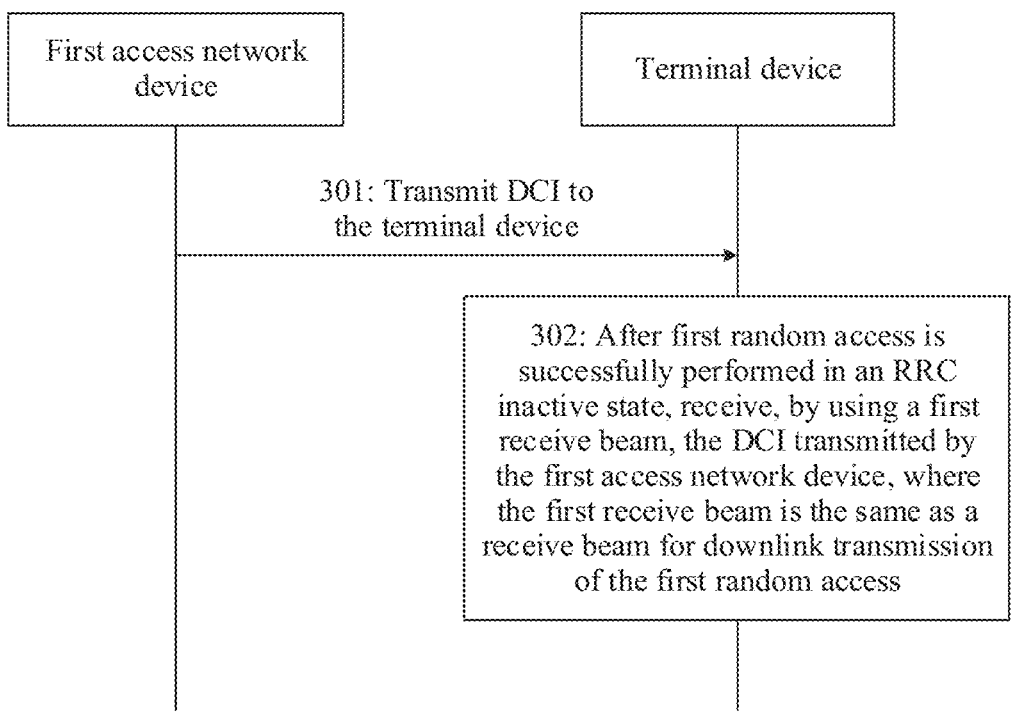
FIG. 3 is a schematic flowchart of a communication method according to an embodiment of this application.

FIG. 3 is a schematic flowchart of a communication method according to an embodiment of this application. As shown in FIG. 3, the communication method includes the following step 301 and step 302. The method shown in FIG. 3 may be performed by a first access network device and a terminal device. Alternatively, the method shown in FIG. 3 may be performed by a chip in the first access network device and a chip in the terminal device. In FIG. 3, the first access network device and the terminal device are used as examples for description. An execution entity of a subsequent flowchart is similar. Details are not described below again.

301: The first access network device transmits downlink control information (DCI) to the terminal device.

In this embodiment of this application, after entering an RRC inactive state, the terminal device may initiate first random access when user data needs to be transmitted, to initiate an RA (random access)-data transmission process. After the first random access is completed, the first access network device transmits the DCI to the terminal device, where the DCI allocates an uplink transmission resource or a downlink transmission resource. The first random access may be four-step random access or two-step random access. When the first random access is four-step random access, for a procedure of the first random access, refer to the description in the following embodiment corresponding to FIG. 4. When the first random access is two-step random access, for a procedure of the first random access, refer to the description in the following embodiment corresponding to FIG. 5.

In embodiments of this application, the first access network device transmits the DCI by using a second transmit beam, where the second transmit beam is the same as a transmit beam for downlink transmission in the first random access.

In the full text of embodiments of this application, that beams are the same means quasi-colocation of transmission. For a same receive beam, for example, receive beams of information 1 and information 2 are the same. Specifically, the information 2 is received by using a spatial domain transmission filter (use the same spatial domain transmission filter) or a spatial domain parameter of the information 1. For a same transmit beam, for example, transmit beams of the information 1 and the information 2 are the same. Specifically, the information 2 is transmitted by using the spatial domain transmission filter (use the same spatial domain transmission filter) of the information 1.

In a possible implementation, if the first random access is four-step random access, the second transmit beam is the same as a transmit beam of a message 2 or a message 4 in the first random access.

In a possible implementation, if the first random access is two-step random access, the second transmit beam is the same as a transmit beam of a message B in the first random access.

In a possible implementation, the second transmit beam corresponds to a first preamble. Alternatively, the second transmit beam corresponds to a time-frequency resource of a first preamble. The first preamble corresponds to a first SSB, or the time-frequency resource of the first preamble corresponds to a first SSB. The second transmit beam, the transmit beam of the downlink transmission of the first random access, and a transmit beam of the first SSB are the same. For the first SSB, refer to the description in the embodiment corresponding to FIG. 4 or FIG. 5. Transmission is performed by using a beam that is the same as the transmit beam of the first SSB. This helps improve signal received quality of the terminal device.

302: After successfully performing the first random access in the RRC inactive state, the terminal device receives, by using a first receive beam, the DCI transmitted by the first access network device, where the first receive beam is the same as a receive beam of the downlink transmission of the first random access.

In a possible implementation, if the first random access is four-step random access, the first receive beam is the same as a receive beam of the message 2 or the message 4 in the first random access.

In another possible implementation, if the first random access is two-step random access, the first receive beam is the same as a receive beam of the message B in the first random access.

In a possible implementation, the first receive beam corresponds to the first preamble. Alternatively, the first receive beam corresponds to a time-frequency resource of the first preamble. The first preamble corresponds to a first SSB, or the time-frequency resource of the first preamble corresponds to a first SSB. The first receive beam, a receive beam of the downlink transmission of the first random access, and a receive beam of the first SSB are the same. Performing transmission by using a beam that is the same as the receive beam of the first SSB helps improve signal received quality of the terminal device.

In a possible implementation, the DCI indicates a downlink transmission resource or an uplink transmission resource. If the DCI indicates the downlink transmission resource, after receiving the DCI, the terminal device may further perform downlink transmission through the downlink transmission resource, and a receive beam of the downlink transmission is the same as the first receive beam. Correspondingly, the first access network device may perform downlink transmission through the downlink transmission resource, and a transmit beam of the downlink transmission is the same as the second transmit beam.

If the DCI indicates the uplink transmission resource, after the DCI, uplink transmission may be further performed through the uplink transmission resource by using a first transmit beam, where the first transmit beam is the same as a transmit beam for uplink transmission in the first random access. Correspondingly, the first access network device may receive data through the uplink transmission resource by using a second receive beam, where the second receive beam is the same as a receive beam for uplink transmission in the first random access.

In this possible implementation, the terminal device performs, in the RRC inactive state by using a previously transmitted beam, the downlink transmission through the downlink transmission resource indicated by the DCI, or performs the uplink transmission through the uplink transmission resource. In this way, the terminal device does not need to perform a series of operations such as beam measurement and measurement result reporting to determine a beam used for the uplink transmission or the downlink transmission, thereby reducing power consumption of the terminal device.

In a possible implementation, if the first random access is four-step random access, the first transmit beam is the same as a transmit beam of a message 1 or a message 3 in the first random access.

In another possible implementation, if the first random access is two-step random access, the first transmit beam is the same as a transmit beam of a message A in the first random access.

In a possible implementation, if the first random access is four-step random access, the second receive beam is the same as a receive beam of the message 1 or the message 3 in the first random access.

In another possible implementation, if the first random access is two-step random access, the second receive beam is the same as a receive beam of the message A in the first random access.

In a possible implementation, after the terminal device performs downlink transmission on the downlink transmission resource indicated by the DCI, the terminal device may further transmit a HARQ feedback to the first access network device, where a transmit beam of the HARQ feedback is the same as the first transmit beam. The downlink transmission may be receiving a physical downlink shared channel (PDSCH). The HARQ feedback is a HARQ feedback for the downlink transmission. Correspondingly, the first access network device receives the HARQ feedback transmitted by the terminal device, where a receive beam of the HARQ feedback is the second receive beam.

Based on this possible implementation, the terminal device transmits the HARQ feedback in the RRC inactive state by using a previously transmitted beam. In this way, the terminal device does not need to perform a series of operations such as beam measurement and measurement result reporting to determine the transmit beam used for transmitting the HARQ feedback, thereby reducing power consumption of the terminal device.

Optionally, the PDSCH received, by using the first receive beam, by the terminal device through the downlink transmission resource indicated by the DCI may further carry a second RRC release message. The second RRC release message is a response to an RRC resume request in the first random access. After receiving the second RRC release message, the terminal device terminates the current RA-data transmission process.

In a possible implementation, after the terminal device performs uplink transmission on the uplink transmission resource indicated by the DCI by using the first transmit beam, the terminal device may further receive a HARQ feedback transmitted by the first access network device, where a receive beam of the HARQ feedback is the same as the first receive beam. The uplink transmission may be transmitting a physical uplink shared channel (PUSCH). The HARQ feedback is a HARQ feedback for the uplink transmission. Correspondingly, the first access network device transmits the HARQ feedback to the terminal device, where a transmit beam of the HARQ feedback is the same as the second transmit beam.

Based on this possible implementation, the terminal device receives the HARQ feedback in the RRC inactive state by using a previously transmitted beam. In this way, the terminal device does not need to perform a series of operations such as beam measurement and measurement result reporting to determine the receive beam used for receiving the HARQ feedback, thereby reducing power consumption of the terminal device.

In a possible implementation, before receiving the DCI transmitted by the first access network device, the terminal device further monitors a PDCCH corresponding to a C-RNTI, where the DCI is carried on the PDCCH corresponding to the C-RNTI. After the PDCCH corresponding to the C-RNTI is monitored, the DCI can be received from the PDCCH corresponding to the C-RNTI. The PDCCH corresponding to the C-RNTI is a PDCCH scrambled by using the C-RNTI. In this specification, the C-RNTI is a C-RNTI of the terminal device.

In a possible implementation, the terminal device monitors, by default, the PDCCH corresponding to the C-RNTI, and monitors the PDCCH of the C-RNTI by using the first receive beam.

In another possible implementation, the terminal device may further receive indication information transmitted by the first access network device. If the indication information indicates to monitor the PDCCH corresponding to the C-RNTI, the terminal device monitors the PDCCH corresponding to the C-RNTI. If the indication information indicates not to monitor the PDCCH corresponding to the C-RNTI, the terminal device does not monitor the PDCCH corresponding to the C-RNTI. In other words, the terminal device monitors the PDCCH corresponding to the C-RNTI when the first access network device indicates the terminal device to monitor. This helps reduce power consumption of the terminal device.

In a possible implementation, the first random access is four-step random access, and the indication information is carried in the message 4 of the first random access. Based on this possible implementation, the indication information can be carried in an existing message, and no new message is added to carry the indication information. This facilitates implementation. Alternatively, the first random access is four-step random access, and the indication information may not be carried in the message 4, for example, may be carried in the message 2, or a new message is separately used to transmit the indication information.

In a possible implementation, the first random access is two-step random access, and the indication information is carried in the message B of the first random access. Based on this possible implementation, the indication information can be carried in an existing message, and no new message is added to carry the indication information. This facilitates implementation. Alternatively, the first random access is two-step random access, and the indication information may not be carried in the message B. For example, a new message may be separately used to transmit the indication information.

In a possible implementation, the indication information may implicitly indicate whether to monitor the PDCCH corresponding to the C-RNTI. Alternatively, the indication information may explicitly indicate whether to monitor the PDCCH corresponding to the C-RNTI.

① Implicit indication: When the indication information may be a first RRC release message, and the first RRC release message does not carry a next hop chain counter NCC indication, an inactive-radio network temporary identifier I-RNTI, or a pause configuration, it indicates to monitor the PDCCH corresponding to the C-RNTI, and the pause configuration indicates the terminal device to stay in the RRC inactive state. When the first RRC release message carries the next hop chain counter NCC indication, the inactive-radio network temporary identifier I-RNTI, or the pause configuration, it indicates not to monitor the PDCCH corresponding to the C-RNTI. Whether the terminal device monitors the PDCCH corresponding to the C-RNTI is indicated in an implicit manner. In this way, no new signaling is required to indicate the terminal device whether to monitor the PDCCH corresponding to the C-RNTI, thereby reducing transmission resources.

② Explicit indication: Explicit indication means indication by some bits. For example, if a bit of the indication information is 1, it indicates to monitor the PDCCH corresponding to the C-RNTI. If a bit of the indication information is 0, it indicates not to monitor the PDCCH corresponding to the C-RNTI. Alternatively, a quantity of bits of the indication information may be greater than 1. This is not limited in embodiments of this application.

In a possible implementation, when a first condition is met, the terminal device stops monitoring the PDCCH corresponding to the C-RNTI. The first condition is one of the following conditions: beam failure occurs and a timer expires. The timer is used to control the terminal device to monitor the PDCCH of the C-RNTI. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2.

In this possible implementation, when the RSRP of the first receive beam is less than the first threshold, or the N consecutive RSRPs of the first receive beam are less than the first threshold, it indicates that beam failure occurs on the first receive beam (that is, signal received quality of the first receive beam is poor), and the first receive beam cannot continue to be used. After the timer expires, it indicates that there is a high probability that signal received quality of the first receive beam is already poor, and the first receive beam cannot continue to be used. Therefore, based on this possible implementation, when beam failure occurs on the first receive beam or there is a high probability that signal received quality of the first receive beam is already poor, monitoring for the PDCCH corresponding to the C-RNTI can be stopped in a timely manner, to reduce power consumption of the terminal device.

In another possible implementation, when the first condition is met, the terminal device stops monitoring the PDCCH corresponding to the C-RNTI. The first condition is one of the following conditions: beam failure occurs and a timer expires. The timer is used to control the terminal device to monitor the PDCCH of the C-RNTI, or the timer is used to control validity of a transmit beam. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2; or a reference signal received power RSRP of a receive beam corresponding to the first transmit beam is less than a second threshold; or N consecutive RSRPs of a receive beam corresponding to the first transmit beam are less than a second threshold, where N is an integer greater than or equal to 2; or in a first time period, N consecutive RSRPs of a receive beam corresponding to the first transmit beam are less than a second threshold, where N is an integer greater than or equal to 2.

Based on this possible implementation, when beam failure occurs on the first receive beam or there is a high probability that signal received quality of the first receive beam is already poor, monitoring for the PDCCH corresponding to the C-RNTI can be stopped in a timely manner, to reduce the power consumption of the terminal device. Alternatively, based on this possible implementation, when beam failure occurs on the first transmit beam or the first transmit beam is invalid, monitoring for the PDCCH corresponding to the C-RNTI can be stopped in a timely manner, to reduce the power consumption of the terminal device.

In a possible implementation, when the foregoing first condition is met, the terminal device performs second random access. After the second random access is completed, the terminal device may perform transmission by using a beam that is the same as a beam of the second random access. For example, the terminal device may perform downlink transmission by using a beam that is the same as a receive beam of the second random access, or perform uplink transmission by using a beam that is the same as a transmit beam of the second random access. Therefore, when the foregoing first condition is met, the terminal device may update a beam in time by performing the second random access.

In a first possible implementation, the timer is started or restarted after the message 4 of the random access is received. For example, the timer is started after the message 4 of the first random access is received, and the timer is restarted after a message 4 of the second random access is received.

In a second possible implementation, the timer is started or restarted after the message B of the random access is received. For example, the timer is started after the message B of the first random access is received, and the timer is restarted after a message B of the second random access is received.

In a third possible implementation, the timer is started or restarted after DCI corresponding to the C-RNTI is received. In this embodiment of this application, the DCI corresponding to the C-RNTI is the DCI transmitted to the terminal device. For example, after the first random access succeeds, when the terminal device receives a first piece of DCI, the terminal device starts the timer, and restarts the timer after receiving a second piece of DCI.

In a fourth possible implementation, the timer is started or restarted after the terminal device performs transmission based on a transmission resource indicated by DCI corresponding to the C-RNTI. For example, after the first random access succeeds, the terminal device starts the timer after performing transmission for the first time based on the transmission resource indicated by the DCI corresponding to the C-RNTI, and restarts the timer after performing transmission for the second time based on the transmission resource indicated by the DCI corresponding to the C-RNTI.

In a possible implementation, the terminal device may further receive second indication information transmitted by the first access network device, where the second indication information indicates duration of the timer. Based on this possible implementation, the duration of the timer can be flexibly controlled. Alternatively, the duration of the timer may be specified in advance in a protocol.

In a possible implementation, the first random access and the second random access are four-step random access. The message 2 of the first random access includes a first temporary C-RNTI. A message 3 of the second random access carries a C-RNTI, and the C-RNTI is the same as the first temporary C-RNTI. A PDCCH in the message 4 of the second random access is scrambled by using the C-RNTI. When the second random access is four-step random access, for a specific process of the second random access, refer to the description in the embodiment corresponding to FIG. 12. Details are not described herein.

In one data transmission process, the terminal device in the RRC inactive state may perform a plurality of random access processes, and a temporary C-RNTI is allocated to each of the plurality of random access processes. As described above, after the random access succeeds, when the terminal device receives an RRC release message for an RRC resume request, the current data transmission process ends. In one data transmission process of the terminal device in the RRC inactive state, after the first random access is completed, the terminal device determines, as the C-RNTI, the first temporary C-RNTI sent by the first access network device. After the first random access is completed, the first access network device transmits the first temporary C-RNTI of the first random access process to the second access network device (namely, a last serving gNB), so that the second access network device performs a security-related operation in a next data transmission process. In another random access process in a data transmission process, the first access network device also allocates a second temporary C-RNTI to the terminal device. However, the C-RNTI is the first temporary C-RNTI in the first random access, and the terminal device does not use the second temporary C-RNTI as the C-RNTI. The first access network device does not transmit the second temporary C-RNTI to the second access network device, to avoid an unnecessary security misalignment risk. For example, if the first access network device transmits the second temporary C-RNTI to the second access network device in a second random access process, but the terminal device does not succeed in contention in the second random access process, the C-RNTI in the second access network device and the C-RNTI do not match. This affects identity authentication performed by the second access network device on the terminal device in a next data transmission process. Therefore, in this possible implementation, the C-RNTI is always the first temporary C-RNTI in the current data transmission process. In this way, the first access network device may transmit the C-RNTI (namely, the first temporary C-RNTI) to the second access network device (namely, the last serving gNB) only once in the current data transmission process. In this way, a potential risk of security misalignment can be avoided, and signaling interaction between two access network devices can be reduced.

Optionally, the second temporary C-RNTI may be used to perform retransmission scheduling on the message 3 of the second random access.

In a possible implementation, the first random access and the second random access are two-step random access. The message B of the first random access includes a first C-RNTI. A message A of the second random access carries a C-RNTI, and the C-RNTI is the same as the first C-RNTI. A PDCCH in the message B of the second random access is scrambled by using the C-RNTI. When the second random access is two-step random access, for an execution procedure of the second random access, refer to the procedure shown in FIG. 14. Details are not described herein. In this possible implementation, the C-RNTI is always the first C-RNTI in the message B of the first random access in the current data transmission process. In this way, the first access network device may transmit the C-RNTI (namely, the first C-RNTI) to the second access network device (namely, a last serving gNB) only once in the current data transmission process. In this way, a potential risk of security misalignment is avoided, and signaling interaction between the two access network devices is reduced.

It can be learned that, based on the method described in FIG. 3, the terminal device performs current transmission in the RRC inactive state by using a previously transmitted beam. In this way, the terminal device does not need to perform a series of operations such as beam measurement and measurement result reporting to determine the beam, thereby reducing power consumption of the terminal device.

Figure 4:
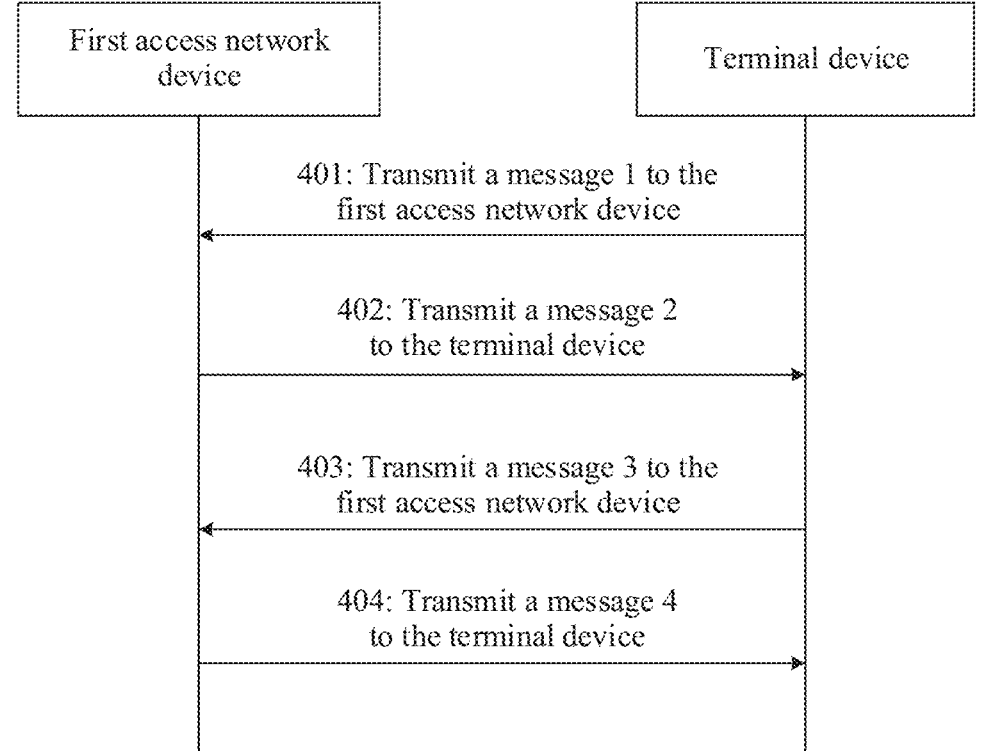
FIG. 4 is a schematic flowchart of first random access according to an embodiment of this application.

FIG. 4 is a schematic flowchart of first random access according to an embodiment of this application. As shown in FIG. 4, a procedure of the first random access includes the following step 401 to step 404.

401: A terminal device transmits a message 1 (MSG1) to a first access network device.

The message 1 includes a first preamble. A function of the preamble is to notify the first access network device of a random access request, and enable the first access network device to calculate a transmission delay between the first access network device and the terminal device, so that the first access network device calibrates uplink timing, and notifies the terminal device of calibration information by using a timing advance command (TA command).

The first access network device periodically transmits an SSB. The first access network device transmits a plurality of SSBs in each periodicity. There is a correspondence between each SSB in the plurality of SSBs and a random access time-frequency resource (namely, a time-frequency resource corresponding to a preamble) or a preamble. The terminal device measures the plurality of SSBs, and determines a first SSB from the plurality of SSBs, where a reference signal received power (RSRP) of the first SSB is greater than or equal to a threshold. The first preamble corresponds to the first SSB, or a time-frequency resource of the first preamble corresponds to the first SSB.

A transmit beam of the message 1 is determined by the terminal device. For example, the transmit beam of the message 1 may be randomly determined by the terminal device, or an RSRP of a receive beam corresponding to the transmit beam of the message 1 is greater than or equal to a threshold.

The receive beam of the message 1 is determined by the first access network device. For example, the receive beam of the message 1 may be randomly determined by the first access network device, or an RSRP of the receive beam of the message 1 is greater than or equal to the threshold.

402: The first access network device transmits a message 2 (MSG2) to the terminal device.

The message 2 may also be referred to as a random access response (RAR). The message 2 includes but is not limited to a first temporary cell radio network temporary identifier (first temporary C-RNTI), an uplink grant (ULgrant), and a timing advance command (TA command). The TA command is used to adjust an uplink advance, and the uplink advance is used in subsequent scheduling transmission. The UL grant indicates a transmission resource of a message 3.

In a possible implementation, a receive beam of the message 2 corresponds to the first preamble, or a receive beam of the message 2 corresponds to the time-frequency resource of the first preamble. The receive beam of the message 2 is the same as a receive beam of the first SSB.

In another possible implementation, the receive beam of the message 2 may alternatively be randomly determined by the terminal device, or an RSRP of the receive beam of the message 2 is greater than or equal to a threshold.

In a possible implementation, a transmit beam of the message 2 corresponds to the first preamble, or a transmit beam of the message 2 corresponds to the time-frequency resource of the first preamble. The transmit beam of the message 2 is the same as a transmit beam of the first SSB.

In another possible implementation, the transmit beam of the message 2 may alternatively be randomly determined by the first access network device, or an RSRP of a receive beam corresponding to the transmit beam of the message 2 is greater than or equal to a threshold.

403: The terminal device transmits a message 3 (MSG3) to the first access network device.

The message 3 includes an RRC resume request and first uplink data.

A transmit beam of the message 3 is the same as the transmit beam of the message 1. A receive beam of the message 3 is the same as the receive beam of the message 1.

404: The first access network device transmits a message 4 (MSG4) to the terminal device.

The MSG4 may also be referred to as a contention resolution message. A receive beam of the message 4 is the same as the receive beam of the message 2. A transmit beam of the message 4 is the same as the transmit beam of the message 2.

After receiving the message 4, the terminal device determines that the first temporary C-RNTI is a C-RNTI of the terminal device. The C-RNTI of the terminal device is used to identify the terminal device.

After the first random access succeeds, the terminal device may further transmit a HARQ feedback for the message 4 to the first access network device. A transmit beam of the HARQ feedback is the same as the transmit beam of the message 1 or the message 3. A receive beam of the HARQ feedback is the same as the receive beam of the message 1 or the message 3.

FIG. 5 is another schematic flowchart of first random access according to an embodiment of this application. As shown in FIG. 5, the first random access includes the following step 501 and step 502.

501: A terminal device transmits a message A (MSGA) to a first access network device.

The message A includes a first preamble, an RRC resume request, and first uplink data. That is, the message A includes content of a message 1 and a message 2 in four-step random access.

Similarly, the first access network device periodically transmits an SSB. The first access network device transmits a plurality of SSBs in each periodicity. There is a correspondence between each SSB in the plurality of SSBs and a random access time-frequency resource (namely, a time-frequency resource corresponding to a preamble) or a preamble. The terminal device measures the plurality of SSBs, and determines a first SSB from the plurality of SSBs, where a reference signal received power (RSRP) of the first SSB is greater than or equal to a threshold. The first preamble corresponds to the first SSB, or a time-frequency resource of the first preamble corresponds to the first SSB.

A transmit beam of the message A is determined by the terminal device. For example, the transmit beam of the message A may be randomly determined by the terminal device, or an RSRP of a receive beam corresponding to the transmit beam of the message A is greater than or equal to a threshold.

A receive beam of the message A is determined by the first access network device. For example, the receive beam of the message A may be randomly determined by the first access network device, or an RSRP of the receive beam of the message A is greater than or equal to the threshold.

502: The first access network device transmits a message B (MSGB) to the terminal device.

The MSGB includes a fallback RAR or a success RAR. The fallback RAR includes a first temporary C-RNTI, a TA command, and an UL grant. The success RAR includes a first C-RNTI, contention resolution, a TA command, a hybrid automatic repeat request feedback timing indicator (HARQ feedback timing indicator), and a physical uplink control channel resource indicator (PUCCH resource indicator).

If the first access network device successfully decodes the first preamble, but fails to decode the RRC resume request and the first uplink data, the first access network device transmits the fallback RAR to the terminal device. The terminal device transmits scheduling transmission to the first access network device based on the fallback RAR, which is similar to transmitting the message 3 in the foregoing four-step random access. Then, the terminal device receives a contention resolution message from the first access network device, which is similar to receiving the message 4 in the foregoing four-step random access. After receiving the contention resolution message, the terminal device determines that the first temporary C-RNTI is a C-RNTI of the terminal device, and the first random access is completed.

If the first access network device successfully decodes the first preamble, the RRC resume request, and the first uplink data, the first access network device transmits the success RAR to the terminal device. The terminal device determines that the first C-RNTI in the success RAR is the C-RNTI of the terminal device, and the first random access process is completed.

In a possible implementation, a receive beam of the message B corresponds to the first preamble, or a receive beam of the message B corresponds to the time-frequency resource of the first preamble. The receive beam of the message B is the same as a receive beam of the first SSB.

In a possible implementation, a transmit beam of the message B corresponds to the first preamble, or a transmit beam of the message B corresponds to the time-frequency resource of the first preamble. The transmit beam of the message B is the same as a transmit beam of the first SSB.

In another possible implementation, the receive beam used by the terminal device to receive the message B may alternatively be randomly determined by the terminal device, or the receive beam used by the terminal device to receive the message B is a receive beam with a largest RSRP.

After the first random access succeeds, the terminal device may further transmit a HARQ feedback to the first access network device. There are two cases herein. For the success RAR, the HARQ feedback transmitted by the terminal device is a HARQ feedback of the success RAR. A HARQ feedback resource is indicated by a HARQ feedback timing indicator and a PUCCH resource indicator in the success RAR. The HARQ feedback timing indicator indicates a time domain resource, and the PUCCH resource indicator indicates a frequency domain resource. For the fallback RAR, the HARQ feedback transmitted by the terminal device is contention resolution HARQ feedback. A transmit beam of the HARQ feedback is the same as the transmit beam of the message A. A receive beam of the HARQ feedback is the same as the receive beam of the message A.

FIG. 6 is a schematic flowchart of another communication method according to an embodiment of this application. As shown in FIG. 6, the communication method includes the following step 601.

601: In a radio resource control inactive RRC inactive state, a terminal device transmits an RRC resume request and first uplink data to a first access network device through a first configured grant (CG) resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

Correspondingly, the first access network device may receive, by using a second receive beam, the RRC resume request and the first uplink data that are transmitted by the terminal device. The second receive beam is the same as a receive beam used by the first access network device to receive uplink transmission of the terminal device in the RRC connected state, or the second receive beam is the same as a receive beam used by the first access network device to receive uplink transmission of the terminal device in the RRC inactive state in a previous data transmission process.

A current data transmission process is a CG-data transmission process. If the current data transmission process is a first data transmission process after the terminal device enters the RRC inactive, the first transmit beam is the same as a transmit beam of the terminal device in the RRC connected state. If the current data transmission process is not the first data transmission process after the terminal device enters the RRC inactive, the first transmit beam is the same as a transmit beam in a previous data transmission process in which the terminal device is in the RRC inactive state. The previous data transmission process may be a CG-data transmission process or an RA-data transmission process.

If the current data transmission process is the first data transmission process after the terminal device enters the RRC inactive, the second receive beam is the same as the receive beam used by the first access network device to receive the uplink transmission of the terminal device in the RRC connected state. If the current data transmission process is not the first data transmission process after the terminal device enters the RRC inactive, the second receive beam is the same as the receive beam used by the first access network device to receive the uplink transmission of the terminal device in the RRC inactive state in the previous data transmission process.

In a possible implementation, that the first transmit beam is the same as a transmit beam of the terminal device in the RRC connected state specifically means that: The first transmit beam is the same as a transmit beam finally used by the terminal device in the RRC connected state; or the first transmit beam is the same as the last indicated transmit beam when the terminal device is in the RRC connected state; or the first transmit beam is the same as the last transmit beam determined by the terminal device in the RRC connected state; or the first transmit beam is the same as a transmit beam finally used by the terminal device to transmit a PUCCH, a PUSCH, or an SRS when the terminal device is in the RRC connected state; or the first transmit beam is the same as the last indicated transmit beam when the terminal device is in the RRC connected state and that is used to transmit a PUCCH, a PUSCH, or an SRS; or the first transmit beam is the same as the last transmit beam that is determined by the terminal device in the RRC connected state and that is used to transmit a PUCCH, a PUSCH, or an SRS.

In a possible implementation, that the first transmit beam is the same as a transmit beam in a previous data transmission process in which the terminal device is in the RRC inactive state means that: The first transmit beam is the same as a transmit beam finally used in the previous data transmission process in which the terminal device is in the RRC inactive state; or the first transmit beam is the same as the last transmit beam determined in the previous data transmission process in which the terminal device is in the RRC inactive state.

In a possible implementation, that the second receive beam is the same as the receive beam used by the first access network device to receive the uplink transmission of the terminal device in the RRC connected state means that: The second receive beam is the same as a receive beam that is finally used by the first access network device to receive the uplink transmission of the terminal device in the RRC connected state; or the second receive beam is the same as a receive beam that is finally used by the first access network device to receive a PUCCH, a PUSCH, or an SRS that is transmitted by the terminal device in the RRC connected state.

In a possible implementation, that the second receive beam is the same as the receive beam used by the first access network device to receive the uplink transmission of the terminal device in the RRC inactive state in the previous data transmission process means that: The second receive beam is the same as a receive beam that is finally used by the first access network device to receive the uplink transmission of the terminal device in the RRC inactive state in the previous data transmission process.

It can be learned that, based on the method described in FIG. 6, the terminal device performs current transmission in the RRC inactive state by using a previously transmitted beam. In this way, the terminal device does not need to perform a series of operations such as beam measurement and measurement result reporting to determine the beam, thereby reducing power consumption of the terminal device.

FIG. 7 is a schematic flowchart of another communication method according to an embodiment of this application. As shown in FIG. 7, the communication method includes the following step 701 to step 703. A specific implementation of step 701 is the same as that of step 601 in FIG. 6. Details are described herein again.

701: In a radio resource control inactive RRC inactive state, a terminal device transmits an RRC resume request and first uplink data to a first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

702: The first access network device transmits, to the terminal device, a first response transmitted for the RRC resume request and the first uplink data.

In this embodiment of this application, after receiving the RRC resume request and the first uplink data that are transmitted by the terminal device, the first access network device transmits, to the terminal device, the first response transmitted for the RRC resume request and the first uplink data.

In a possible implementation, the first response may be a HARQ feedback, a dynamic grant (DG), or an RRC release message.

The HARQ feedback includes a NACK (negative acknowledgment) or an ACK (acknowledgement). The NACK indicates that the first access network device fails to obtain the RRC resume request and the first uplink data through decoding, and the ACK indicates that the first access network device successfully obtains the RRC resume request and the first uplink data through decoding. If the first response is a HARQ feedback, for an operation after the terminal device receives the first response, refer to descriptions in FIG. 8 and FIG. 9. Details are not described herein.

The DG may include the following indication information: (1) indication information 1, used to indicate retransmission or new transmission, where for example, NDI (New data indicator)=0 indicates retransmission or NDI not reversed indicates retransmission, and NDI=1 indicates new transmission or NDI reversed indicates new transmission; (2) indication information 2, used to indicate a time-frequency resource for retransmission or new transmission; and (3) indication information 3, used to indicate a modulation and coding scheme (MCS) used for retransmission or new transmission. If the first response is a DG, for an operation after the terminal device receives the first response, refer to descriptions in FIG. 10 and FIG. 11. Details are not described herein.

If the first response is an RRC release message, the terminal device terminates a current CG-data transmission process.

The first access network device may transmit, to the terminal device by using a second transmit beam, the first response transmitted for the RRC resume request and the first uplink data. The second transmit beam is the same as a transmit beam used by the first access network device to transmit downlink transmission to the terminal device in the RRC connected state; or the second transmit beam is the same as a transmit beam used by the first access network device to transmit downlink transmission to the terminal device in the RRC inactive state in the previous data transmission process. The second transmit beam is a transmit beam associated with the first CG resource.

If a current data transmission process is a first data transmission process after the terminal device enters the RRC inactive, the second transmit beam is the same as a transmit beam used by the first access network device to transmit the downlink transmission to the terminal device in the RRC connected state, or the second transmit beam is the transmit beam associated with the first CG resource. If a current data transmission process is not a first data transmission process after the terminal device enters the RRC inactive, the second transmit beam is the same as a transmit beam used by the first access network device to transmit the downlink transmission to the terminal device in the RRC inactive state in the previous data transmission process; or the second transmit beam is the transmit beam associated with the first CG resource.

In a possible implementation, that the second transmit beam is the same as a transmit beam used by the first access network device to transmit the downlink transmission to the terminal device in the RRC connected state means that: The second transmit beam is the same as a transmit beam that is finally used by the first access network device to transmit the downlink transmission to the terminal device in the RRC connected state; or the second transmit beam is the same as a transmit beam that is finally used by the first access network device to transmit a PDCCH or a PDSCH to the terminal device in the RRC connected state.

In a possible implementation, that the second transmit beam is the same as a transmit beam used by the first access network device to transmit the downlink transmission to the terminal device in the RRC inactive state in the previous data transmission process means that: The second transmit beam is the same as a transmit beam that is finally used by the first access network device to transmit the downlink transmission to the terminal device in the RRC inactive state in the previous data transmission process.

703: The terminal device receives, by using a first receive beam, the first response that is transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

If the current data transmission process is the first data transmission process after the terminal device enters the RRC inactive, the first receive beam is the same as the receive beam of the terminal device in the RRC connected state, or the first receive beam is the receive beam associated with the first CG resource. If the current data transmission process is not the first data transmission process after the terminal device enters the RRC inactive, the first receive beam is the same as the receive beam in the previous data transmission process in which the terminal device is in the RRC inactive state, or the first receive beam is the receive beam associated with the first CG resource.

In a possible implementation, that the first receive beam is the same as the receive beam of the terminal device in the RRC connected state specifically means that: The first receive beam is the same as a receive beam finally used by the terminal device in the RRC connected state; or the first receive beam is the same as the last indicated receive beam when the terminal device is in the RRC connected state; or the first receive beam is the same as the last receive beam determined by the terminal device in the RRC connected state; or the first receive beam is the same as a receive beam finally used by the terminal device to transmit a PDCCH or a PDSCH when the terminal device is in the RRC connected state; or the first receive beam is the same as the last indicated receive beam that is used to transmit a PDCCH or a PDSCH when the terminal device is in the RRC connected state; or the first receive beam is the same as the last receive beam that is determined by the terminal device in the RRC connected state and that is used to transmit a PDCCH or a PDSCH.

In a possible implementation, that the first receive beam is the same as the receive beam in the previous data transmission process in which the terminal device is in the RRC inactive state means that: The first receive beam is the same as a receive beam finally used in the previous data transmission process in which the terminal device is in the RRC inactive state; or the first receive beam is the same as the last receive beam determined in the previous data transmission process in which the terminal device is in the RRC inactive state.

In a possible implementation, the terminal device may further monitor a C-RNTI or a PDCCH corresponding to a configured scheduling radio network temporary identifier (CS-RNTI), where the PDCCH carries the first response or carries the DCI indicating the transmission resource for the first response. A PDCCH corresponding to the C-RNTI is a PDCCH scrambled by the C-RNTI. A PDCCH corresponding to a CS-RNTI of the terminal device is a PDCCH scrambled by the CS-RNTI of the terminal device.

If the first response is a DG, the PDCCH corresponding to the CS-RNTI of the terminal device carries the first response. If the first response is a HARQ feedback or an RRC release message for the RRC resume request, the PDCCH corresponding to the C-RNTI carries the DCI indicating the transmission resource for the first response. In this way, after monitoring the PDCCH, the terminal device may receive the DCI on the PDCCH, and receive the first response based on the transmission resource that is of the first response and that is indicated by the DCI.

In a possible implementation, when a first condition is met, the terminal device stops monitoring the PDCCH corresponding to the C-RNTI or the CS-RNTI. The first condition includes any one of the following conditions: beam failure occurs and a timer expires. The timer is used to control the terminal device to monitor the PDCCH of the C-RNTI or the CS-RNTI, or the timer is used to control validity of a transmit beam. The beam failure includes any one of the following: A reference signal received power RSRP of the first receive beam is less than a first threshold; or N consecutive RSRPs of the first receive beam are less than a first threshold, where N is an integer greater than or equal to 2; or in a first time period, N consecutive RSRPs of the first receive beam are less than a first threshold, where N is an integer greater than or equal to 2; or a reference signal received power RSRP of a receive beam corresponding to the first transmit beam is less than a second threshold; or N consecutive RSRPs of a receive beam corresponding to the first transmit beam are less than a second threshold, where N is an integer greater than or equal to 2; or in a first time period, N consecutive RSRPs of a receive beam corresponding to the first transmit beam are less than a second threshold, where N is an integer greater than or equal to 2. Based on this possible implementation, when beam failure occurs on the first receive beam or there is a high probability that signal received quality of the first receive beam is already poor, monitoring for the PDCCH corresponding to the C-RNTI or the CS-RNTI can be stopped in a timely manner, to reduce power consumption of the terminal device. Alternatively, based on this possible implementation, when beam failure occurs on the first transmit beam or the first transmit beam is invalid, monitoring for the PDCCH corresponding to the C-RNTI or the CS-RNTI can be stopped in a timely manner, thereby reducing the power consumption of the terminal device.

In a possible implementation, when the first condition is met, the terminal device performs random access. After the random access is completed, the terminal device may perform transmission by using a beam that is the same as a beam of the random access. For example, the terminal device may perform downlink transmission by using a beam that is the same as a receive beam of the random access, and perform uplink transmission by using a beam that is the same as a transmit beam of the random access. Therefore, when the foregoing first condition is met, the terminal device may update a beam in time by performing the random access.

In a possible implementation, the timer is started or restarted when the terminal device receives the DG. Alternatively, the timer is started or restarted when the terminal device performs data transmission based on a CG resource.

In a possible implementation, the random access is four-step random access. A message 3 of the random access carries a C-RNTI. A PDCCH in a message 4 of the random access is scrambled by the C-RNTI. Based on this possible implementation, the C-RNTI does not change after the random access is performed each time. In this way, the first access network device may transmit the C-RNTI to the second access network device only once. In this way, a potential risk of security misalignment can be avoided, and signaling interaction between two access network devices can be reduced.

In a possible implementation, the random access is two-step random access. A message A of the random access includes a C-RNTI, and a PDCCH in a message B of the random access is scrambled by the C-RNTI. Based on this possible implementation, the C-RNTI does not change after the random access is performed each time. In this way, the first access network device may transmit the C-RNTI to the second access network device only once. In this way, a potential risk of security misalignment can be avoided, and signaling interaction between two access network devices can be reduced.

It can be learned that, based on the method described in FIG. 7, a receive beam used by the terminal device to receive the first response for the RRC resume request and the first uplink data in the RRC inactive state is agreed upon. In this way, the terminal device does not need to perform a series of operations such as beam measurement and measurement result reporting to determine the receive beam used for receiving the first response, thereby reducing the power consumption of the terminal device.

FIG. 8 is a schematic flowchart of another communication method according to an embodiment of this application. As shown in FIG. 8, the communication method includes the following step 801 to step 804. A specific implementation of step 801 is the same as that of step 601 in FIG. 6. Details are described herein again.

801: In a radio resource control inactive RRC inactive state, a terminal device transmits an RRC resume request and first uplink data to a first access network device through a first CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

802: The first access network device transmits, to the terminal device, a negative acknowledgment NACK transmitted for the RRC resume request and the first uplink data.

803: The terminal device receives, by using a first receive beam, the NACK that is transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

804: The terminal device retransmits the RRC resume request and the first uplink data to the first access network device through a second CG resource, where a transmit beam for retransmitting the RRC resume request and the first uplink data is the same as a transmit beam for previous uplink transmission.

For example, if the previous uplink transmission of the terminal device is step 801, the transmit beam for retransmitting the RRC resume request and the first uplink data is the same as the first transmit beam. For another example, after receiving the NACK, the terminal device finds that beam failure occurs on the first transmit beam, and the terminal device performs random access to update a beam of the terminal device. In this case, the transmit beam for retransmitting the RRC resume request and the first uplink data is the same as a transmit beam used by the terminal device to perform the random access.

Correspondingly, the first access network device may receive, the RRC resume request and the first uplink data that are retransmitted by the terminal device. A receive beam for the RRC resume request and the first uplink data is the same as a receive beam used in the previous uplink transmission. For example, the receive beam used by the first access network device in the previous uplink transmission is a second receive beam. Alternatively, the receive beam used by the first access network device in the previous uplink transmission is the same as a receive beam used in the random access process.

In a possible implementation, the terminal device may retransmit, by default by using a beam that is the same as the transmit beam for the previous uplink transmission, the RRC resume request and the first uplink data to the first access network device through the second CG resource. Correspondingly, the first access network device may alternatively receive, by default by using a beam that is the same as the receive beam used in the previous uplink transmission, the RRC resume request and the first uplink data retransmitted by the terminal device.

Alternatively, the first access network device may transmit indication information to the terminal device. Correspondingly, the terminal device receives the indication information transmitted by the first access network device. If the indication information indicates that the beam that is the same as the transmit beam for the previous uplink transmission is used to perform uplink transmission, the transmit beam for retransmitting the RRC resume request and the first uplink data is the same as the transmit beam for the previous uplink transmission. Correspondingly, a receive beam for retransmitting the RRC resume request and the first uplink data is the same as the receive beam used in the previous uplink transmission.

If the indication information indicates that the beam that is the same as the transmit beam for the previous uplink transmission is not used to perform uplink transmission, the transmit beam for retransmitting the RRC resume request and the first uplink data is different from the transmit beam for the previous uplink transmission. Correspondingly, a receive beam for retransmitting the RRC resume request and the first uplink data is different from the receive beam used in the previous uplink transmission.

Alternatively, the terminal device may retransmit, by default by not using a beam that is the same as the transmit beam for the previous uplink transmission, the RRC resume request and the first uplink data to the access network device through the second CG resource. The first access network device may alternatively receive, by default by not using a beam that is the same as the receive beam used in the previous uplink transmission, the RRC resume request and the first uplink data retransmitted by the terminal device.

It can be learned that, based on the method described in FIG. 8, the receive beam used by the terminal device to retransmit the RRC resume request and the first uplink data in the RRC inactive state is agreed upon. In this way, the terminal device does not need to perform a series of operations such as beam measurement and measurement result reporting to determine the transmit beam used for retransmitting the RRC resume request and the first uplink data. This helps reduce power consumption of the terminal device.

FIG. 9 is a schematic flowchart of another communication method according to an embodiment of this application. As shown in FIG. 9, the communication method includes the following step 901 to step 904. A specific implementation of step 901 is the same as that of step 601 in FIG. 6. Details are described herein again.

901: In a radio resource control inactive RRC inactive state, a terminal device transmits an RRC resume request and first uplink data to a first access network device through a first configured grant CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

902: The first access network device transmits, to the terminal device, an ACK transmitted for the RRC resume request and the first uplink data.

903: The terminal device receives, by using a first receive beam, the ACK that is transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

904: The terminal device transmits second uplink data to the first access network device through a second CG resource, where a transmit beam of the second uplink data is the same as a transmit beam for previous uplink transmission, and the second uplink data is different from the first uplink data.

The terminal device transmits the second uplink data different from the first uplink data to an access network device, that is, the terminal device transmits new uplink data to the access network device.

For example, if the previous uplink transmission of the terminal device is step 901, the transmit beam of the second uplink data is the same as the first transmit beam. For another example, after receiving the ACK, the terminal device finds that beam failure occurs on the first transmit beam, and the terminal device performs random access to update a beam of the terminal device. In this case, the transmit beam of the second uplink data is the same as a transmit beam used by the terminal device to perform the random access.

Correspondingly, the first access network device receives the second uplink data transmitted by the terminal device. A receive beam of the second uplink data is the same as a receive beam used in the previous uplink transmission. For example, the receive beam used by the first access network device in the previous uplink transmission is a second receive beam. Alternatively, the receive beam used by the first access network device in the previous uplink transmission is the same as a receive beam used in the random access process.

In a possible implementation, the terminal device may transmit, by default by using a beam that is the same as the transmit beam for the previous uplink transmission, the second uplink data to the access network device through the second CG resource. Correspondingly, the first access network device may alternatively receive, by default by using a beam that is the same as the receive beam used in the previous uplink transmission, the second uplink data transmitted by the terminal device.

Alternatively, the first access network device may transmit indication information to the terminal device. Correspondingly, the terminal device receives the indication information transmitted by the first access network device. If the indication information indicates that the beam that is the same as the transmit beam for the previous uplink transmission is used to perform uplink transmission, the transmit beam of the second uplink data is the same as the transmit beam for the previous uplink transmission. A receive beam of the second uplink data is the same as a receive beam used in the previous uplink transmission.

If the indication information indicates that the beam that is the same as the transmit beam for the previous uplink transmission is not used to perform uplink transmission, the transmit beam of the second uplink data is different from the transmit beam for the previous uplink transmission. A receive beam of the second uplink data is different from the receive beam used in the previous uplink transmission.

Alternatively, the terminal device may transmit, by default by not using a beam that is the same as the transmit beam for the previous uplink transmission, the second uplink data to the access network device through the second CG resource. The first access network device may alternatively receive, by default by not using a receive beam that is the same as the receive beam used in the previous uplink transmission, the second uplink data transmitted by the terminal device.

It can be learned that, based on the method described in FIG. 9, the receive beam used by the terminal device to transmit the second uplink data in the RRC inactive state is agreed upon. In this way, the terminal device does not need to perform a series of operations such as beam measurement and measurement result reporting to determine the transmit beam used for transmitting the second uplink data. This helps reduce power consumption of the terminal device.

FIG. 10 is a schematic flowchart of another communication method according to an embodiment of this application. As shown in FIG. 10, the communication method includes the following step 1001 to step 1004. A specific implementation of step 1001 is the same as that of step 601 in FIG. 6. Details are described herein again.

1001: In a radio resource control inactive RRC inactive state, a terminal device transmits an RRC resume request and first uplink data to a first access network device through a first configured grant CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

1002: The first access network device transmits, to the terminal device, a dynamic grant DG transmitted for the RRC resume request and the first uplink data, where the DG indicates retransmission.

1003: The terminal device receives, by using a first receive beam, the DG that is transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

1004: The terminal device retransmits the RRC resume request and the first uplink data to the first access network device, where a transmit beam for retransmitting the RRC resume request and the first uplink data is the same as a transmit beam for previous uplink transmission.

For example, if the previous uplink transmission of the terminal device is step 1001, the transmit beam for retransmitting the RRC resume request and the first uplink data is the same as the first transmit beam. For another example, after receiving the DG indicating the retransmission, the terminal device finds that beam failure occurs on the first transmit beam, and the terminal device performs random access to update a beam of the terminal device. In this case, the transmit beam for retransmitting the RRC resume request and the first uplink data is the same as a transmit beam used by the terminal device to perform the random access.

Correspondingly, the first access network device may receive, the RRC resume request and the first uplink data that are retransmitted by the terminal device. A receive beam for the RRC resume request and the first uplink data is the same as a receive beam used in the previous uplink transmission. For example, the receive beam used by the first access network device in the previous uplink transmission is a second receive beam. Alternatively, the receive beam used by the first access network device in the previous uplink transmission is the same as a receive beam used in the random access process.

In a possible implementation, the terminal device may retransmit, by default by using a beam that is the same as the transmit beam for the previous uplink transmission, the RRC resume request and the first uplink data to an access network device. Correspondingly, the first access network device may alternatively receive, by default by using a beam that is the same as the receive beam used in the previous uplink transmission, the RRC resume request and the first uplink data retransmitted by the terminal device.

Alternatively, the first access network device may transmit indication information to the terminal device. Correspondingly, the terminal device receives the indication information transmitted by the first access network device. If the indication information indicates that the beam that is the same as the transmit beam for the previous uplink transmission is used to perform uplink transmission, the transmit beam for retransmitting the RRC resume request and the first uplink data is the same as the transmit beam for the previous uplink transmission. Correspondingly, a receive beam for retransmitting the RRC resume request and the first uplink data is the same as the receive beam used in the previous uplink transmission.

If the indication information indicates that the beam that is the same as the transmit beam for the previous uplink transmission is not used to perform uplink transmission the transmit beam for retransmitting the RRC resume request and the first uplink data is different from the transmit beam for the previous uplink transmission. Correspondingly, a receive beam for retransmitting the RRC resume request and the first uplink data is different from the receive beam used in the previous uplink transmission.

Alternatively, the terminal device may retransmit, by default by not using a beam that is the same as the transmit beam for the previous uplink transmission, the RRC resume request and the first uplink data to the access network device. The first access network device may alternatively receive, by default by not using a receive beam that is the same as the receive beam used in the previous uplink transmission, the RRC resume request and the first uplink data retransmitted by the terminal device.

It can be learned that, based on the method described in FIG. 10, the receive beam used by the terminal device to retransmit the RRC resume request and the first uplink data in the RRC inactive state is agreed upon. In this way, the terminal device does not need to perform a series of operations such as beam measurement and measurement result reporting to determine the transmit beam used for retransmitting the RRC resume request and the first uplink data. This helps reduce power consumption of the terminal device.

FIG. 11 is a schematic flowchart of another communication method according to an embodiment of this application. As shown in FIG. 11, the communication method includes the following step 1101 to step 1104. A specific implementation of step 1101 is the same as that of step 601 in FIG. 6. Details are described herein again.

1101: In a radio resource control inactive RRC inactive state, a terminal device transmits an RRC resume request and first uplink data to a first access network device through a first configured grant CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

1102: The first access network device may further transmit, to the terminal device, a dynamic grant DG transmitted for the RRC resume request and the first uplink data, where the DG indicates new transmission.

1103: The terminal device receives, by using a first receive beam, the DG that is transmitted by the first access network device for the RRC resume request and the first uplink data, where the first receive beam is the same as a receive beam of the terminal device in the RRC connected state; or the first receive beam is the same as a receive beam in the previous data transmission process in which the terminal device is in the RRC inactive state; or the first receive beam is a receive beam associated with the first CG resource.

1104: The terminal device transmits second uplink data to the first access network device, where a transmit beam of the second uplink data is the same as a transmit beam for previous uplink transmission, and the second uplink data is different from the first uplink data.

The transmit beam of the second sulink data is the same as the transmit beam for the previous uplink transmission. For example, if the previous uplink transmission of the terminal device is step 1101, the transmit beam of the second uplink data is the same as the first transmit beam. For another example, after receiving the DG indicating the new transmission, the terminal device finds that beam failure occurs on the first transmit beam, and the terminal device performs random access to update a beam of the terminal device. In this case, the transmit beam of the second uplink data is the same as a transmit beam used by the terminal device to perform the random access.

Correspondingly, the first access network device receives the second uplink data transmitted by the terminal device. A receive beam of the second uplink data is the same as a receive beam used in the previous uplink transmission. For example, the receive beam used by the first access network device in the previous uplink transmission is a second receive beam. Alternatively, the receive beam used by the first access network device in the previous uplink transmission is the same as a receive beam used in the random access process.

In a possible implementation, the terminal device may transmit, by default by using a beam that is the same as the transmit beam for the previous uplink transmission, the second uplink data to an access network device. Correspondingly, the first access network device may alternatively receive, by default by using a beam that is the same as the receive beam used in the previous uplink transmission, the second uplink data transmitted by the terminal device.

Alternatively, the first access network device may transmit indication information to the terminal device. Correspondingly, the terminal device receives the indication information transmitted by the first access network device. If the indication information indicates that the beam that is the same as the transmit beam for the previous uplink transmission is used to perform uplink transmission, the transmit beam of the second uplink data is the same as the transmit beam for the previous uplink transmission. A receive beam of the second uplink data is the same as a receive beam used in the previous uplink transmission.

If the indication information indicates that the beam that is the same as the transmit beam for the previous uplink transmission is not used to perform uplink transmission, the transmit beam of the second uplink data is different from the transmit beam for the previous uplink transmission. A receive beam of the second uplink data is different from the receive beam used in the previous uplink transmission.

Alternatively, the terminal device may transmit, by default by not using a beam that is the same as the transmit beam for the previous uplink transmission, the second uplink data to the access network device. The first access network device may alternatively receive, by default by not using a receive beam that is the same as the receive beam used in the previous uplink transmission, the second uplink data transmitted by the terminal device.

It can be learned that, based on the method described in FIG. 11, the receive beam used by the terminal device to transmit the second uplink data in the RRC inactive state is agreed upon. In this way, the terminal device does not need to perform a series of operations such as beam measurement and measurement result reporting to determine the transmit beam used for transmitting the second uplink data. This helps reduce power consumption of the terminal device.

Figure 12:
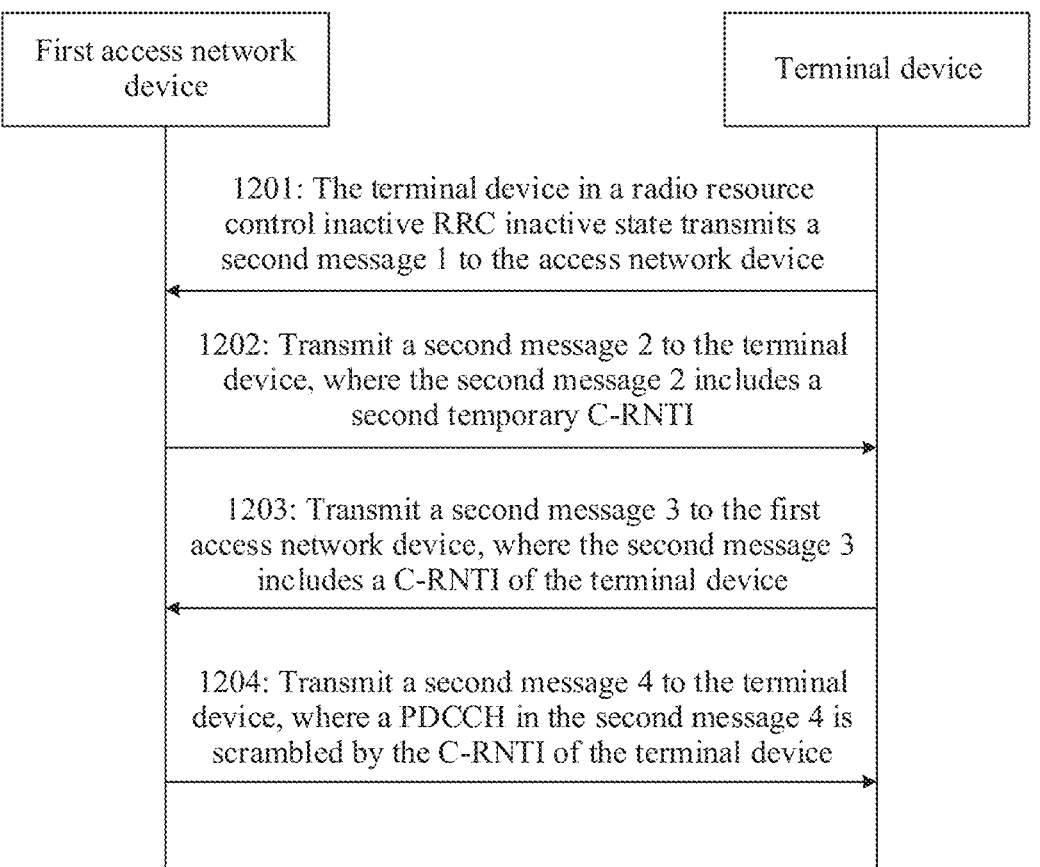
FIG. 12 is a schematic flowchart of still another communication method according to an embodiment of this application.

FIG. 12 is a schematic flowchart of another communication method according to an embodiment of this application. As shown in FIG. 12, the communication method includes the following step 1201 to step 1204.

1201: A terminal device in a radio resource control inactive RRC inactive state transmits a second message 1 to a first network device, where the second message 1 includes a second preamble.

1202: The first access network device transmits a second message 2 to the terminal device, where the second message 2 includes a second temporary C-RNTI.

In this embodiment of this application, after receiving the second message 1 transmitted by the terminal device, the first access network device transmits the second message 2 to the terminal device.

Optionally, the second temporary C-RNTI is used for retransmission scheduling of a second MSG3.

In this embodiment of this application, the first access network device does not transmit the second temporary C-RNTI to a second access network device (namely, a last serving gNB).

1203: The terminal device transmits the second message 3 to the first access network device, where the second message 3 includes a C-RNTI of the terminal device.

In this embodiment of this application, after receiving the second message 2, the terminal device transmits the second message 3 to the first access network device.

In this embodiment of this application, the second message 3 does not include an RRC resume request.

1204: The first access network device transmits a second message 4 to the terminal device, where a PDCCH in the second message 4 is scrambled by the C-RNTI of the terminal device.

In this embodiment of this application, after receiving the second message 3, the first access network device scrambles the PDCCH in the second message 4 by using the C-RNTI that is of the terminal device and that is carried in the second message 3, and then transmits the second message 4 to the terminal device.

In the method described in FIG. 12, the first access network device can use the C-RNTI of the terminal device to scramble the PDCCH in the second message 4, instead of using the second temporary C-RNTI to scramble the PDCCH in the second message 4. The C-RNTI of the terminal device remains unchanged in one data transmission process. In this way, the first access network device may transmit the C-RNTI to the second access network device only once. In this way, a potential risk of security misalignment described above can be avoided, and signaling interaction between two access network devices can be reduced.

Figure 13A:
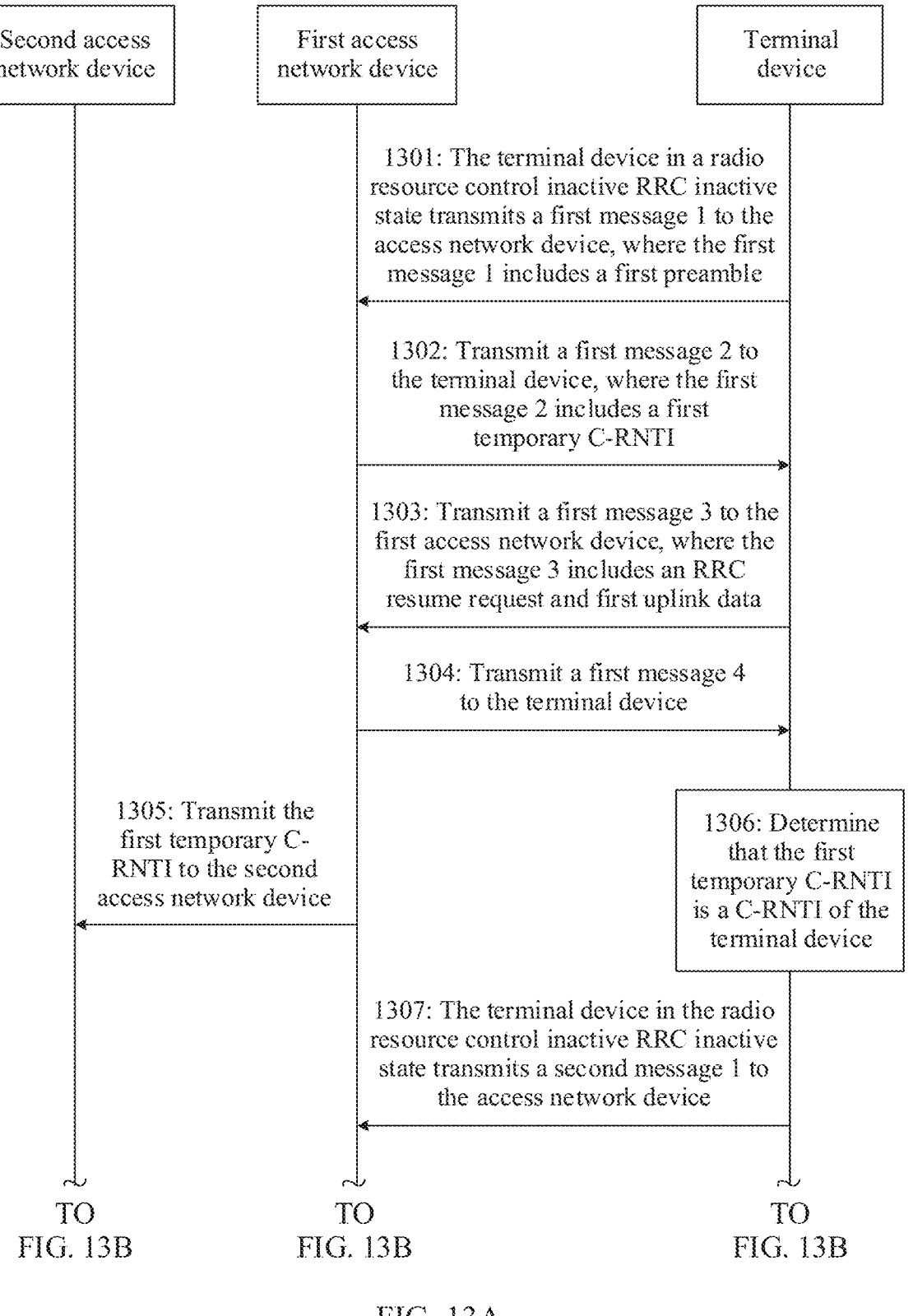

FIG. 13A and FIG. 13B are a schematic flowchart of another communication method according to an embodiment of this application. As shown in FIG. 13A and FIG. 13B, the communication method includes the following step 1301 to step 1310.

1301: A terminal device in a radio resource control inactive RRC inactive state transmits a first message 1 to a first access network device, where the first message 1 includes a first preamble.

1302: The first access network device transmits a first message 2 to the terminal device, where the first message 2 includes a first temporary C-RNTI.

In this embodiment of this application, after receiving the first message 1, the first access network device transmits the first message 2 to the terminal device.

In this embodiment of this application, the first message 2 may further include an uplink grant (UL grant), a timing advance command (TA command), and the like.

1303: The terminal device transmits a first message 3 to the first access network device, where the first message 3 includes an RRC resume request and first uplink data.

In this embodiment of this application, after receiving the first message 2, the terminal device transmits the first message 3 to the first access network device.

1304: The first access network device transmits a first message 4 to the terminal device.

The first message 4 includes some content of the first message 3, and is used for contention resolution.

In this embodiment of this application, after receiving the first message 3, the first access network device transmits the first message 4 to the terminal device.

1305: The first access network device transmits the first temporary C-RNTI to a second access network device.

In this embodiment of this application, the first access network device transmits the first temporary C-RNTI to the second access network device after transmitting the first message 4 to the terminal device. After receiving the first temporary C-RNTI, the second access network device may use the first temporary C-RNTI to perform identity verification on the terminal device in a next data transmission process.

1306: The terminal device determines that the first temporary C-RNTI is a C-RNTI of the terminal device.

In this embodiment of this application, after receiving the first message 4, the terminal device determines that the first temporary C-RNTI is the C-RNTI of the terminal device.

1307: The terminal device in the radio resource control inactive RRC inactive state transmits a second message 1 to an access network device, where the second message 1 includes a second preamble.

1308: The first access network device transmits a second message 2 to the terminal device, where the second message 2 includes a second temporary C-RNTI.

1309: The terminal device transmits a second message 3 to the first access network device, where the second message 3 includes the C-RNTI of the terminal device.

1310: The first access network device transmits a second message 4 to the terminal device, where a PDCCH in the second message 4 is scrambled by the C-RNTI of the terminal device.

Specific implementations of step 1307 to step 1310 are the same as those of step 1201 to step 1204. Details are not described herein again.

In the method described in FIG. 13A and FIG. 13B, the first access network device can use the C-RNTI of the terminal device to scramble the PDCCH in the second message 4, instead of using the second temporary C-RNTI to scramble the PDCCH in the second message 4. The C-RNTI of the terminal device in one data transmission process is the first temporary C-RNTI. In this way, the first access network device may transmit the C-RNTI to the second access network device only once. In this way, a potential risk of security misalignment described above can be avoided, and signaling interaction between two access network devices can be reduced.

FIG. 14 is a schematic flowchart of a communication method according to an embodiment of this application. As shown in FIG. 14, the communication method includes the following step 1401 to step 1404.

1401: A terminal device in an RRC inactive state transmits a second message A to a first access network device, where the second message A includes a second preamble and a C-RNTI of the terminal device.

In this embodiment of this application, the second message A does not include an RRC resume request.

1402: The first access network device transmits a second message B to the terminal device, where a PDCCH in the second message B is scrambled by the C-RNTI of the terminal device.

In this embodiment of this application, after receiving the second message A, the first access network device scrambles the PDCCH in the second message B by using the C-RNTI that is of the terminal device and that is carried in the second message A, and then transmits the second message B to the terminal device.

In the method described in FIG. 14, the first access network device can scramble the PDCCH in the second message B by using the C-RNTI of the terminal device. The C-RNTI of the terminal device remains unchanged in one data transmission process. In this way, the first access network device may transmit the C-RNTI to a second access network device only once. In this way, a potential risk of security misalignment described above can be avoided, and signaling interaction between two access network devices can be reduced.

Figure 15:
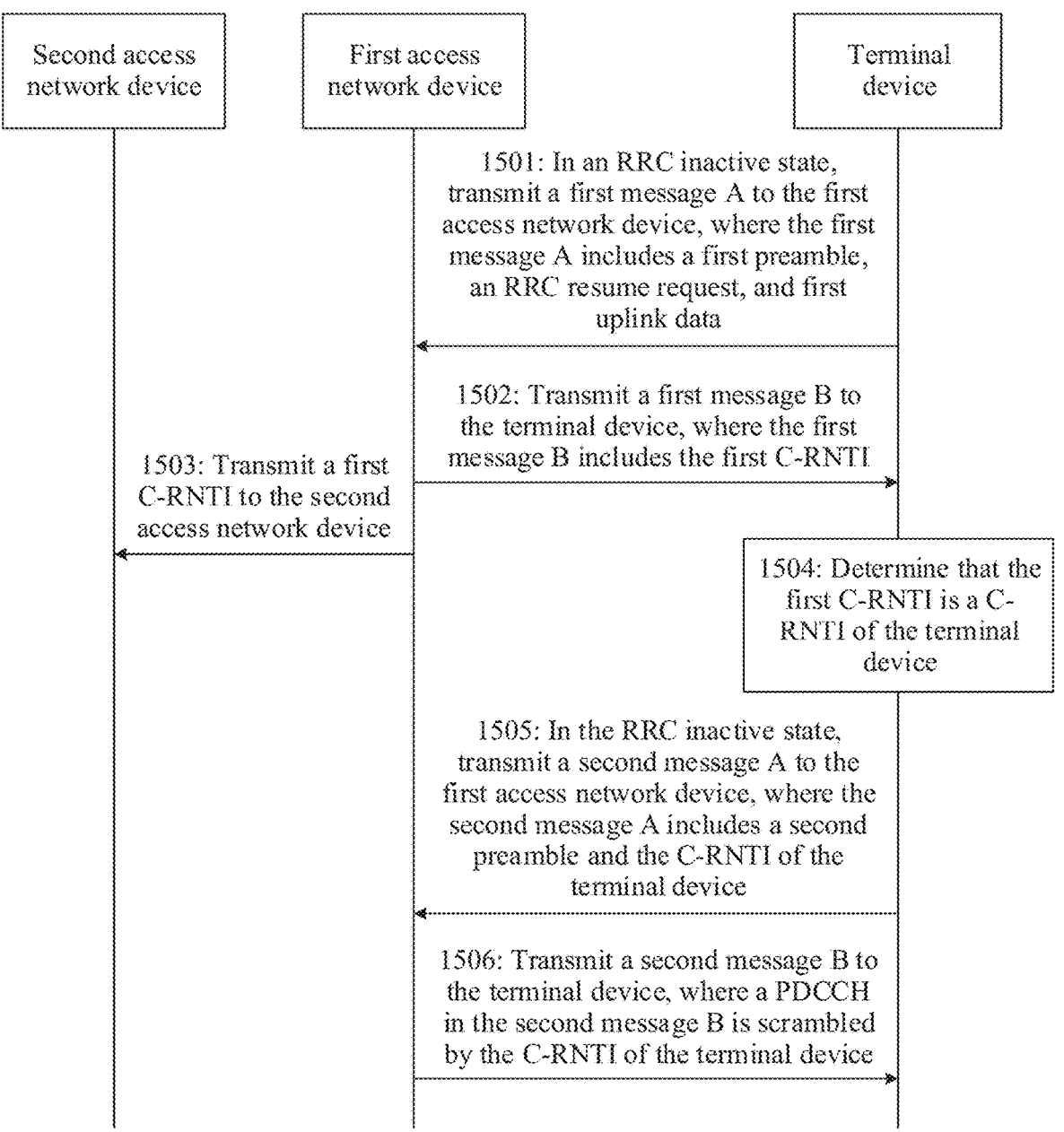
FIG. 15 is a schematic flowchart of still another communication method according to an embodiment of this application.

FIG. 15 is a schematic flowchart of a communication method according to an embodiment of this application. As shown in FIG. 15, the communication method includes the following step 1501 to step 1506.

1501: A terminal device in an RRC inactive state transmits a first message A to a first access network device, where the first message A includes a first preamble, an RRC resume request, and first uplink data.

1502: The first access network device transmits a first message B to the terminal device, where the first message B includes a first C-RNTI.

In this embodiment of this application, after receiving the first message A, the first access network device transmits the first message B to the terminal device.

Optionally, the first message B may further include contention resolution, a TA command, a hybrid automatic repeat request feedback timing indicator (HARQ feedback timing indicator), and a physical uplink control channel resource indicator (PUCCH resource indicator).

1503: The first access network device transmits the first C-RNTI to a second access network device.

In this embodiment of this application, the first access network device transmits the first C-RNTI to the second access network device after transmitting the first message B to the terminal device. After receiving the first C-RNTI, the second access network device may use the first C-RNTI to perform identity verification on the terminal device in a next data transmission process.

1504: The terminal device determines that the first C-RNTI is a C-RNTI of the terminal device.

In this embodiment of this application, after receiving the first message B, the terminal device determines that the first C-RNTI is the C-RNTI of the terminal device, and random access is completed.

1505: The terminal device in the RRC inactive state transmits a second message A to the first access network device, where the second message A includes a second preamble and the C-RNTI of the terminal device.

1506: The first access network device transmits a second message B to the terminal device, where a PDCCH in the second message B is scrambled by the C-RNTI of the terminal device.

Specific implementations of step 1505 to step 1506 are the same as those of step 1501 to step 1506. Details are not described herein again.

In the method described in FIG. 15, the first access network device can scramble the PDCCH in the second message B by using the C-RNTI of the terminal device. The C-RNTI of the terminal device in one data transmission process is the first C-RNTI. In this way, the first access network device may transmit the C-RNTI to the second access network device only once. In this way, a potential risk of security misalignment described above can be avoided, and signaling interaction between two access network devices can be reduced.

The method provided in this application may be further applied to a dual connectivity (DC) scenario. For ease of understanding, the DC scenario is first described with reference to FIG. 16 by using an example in which the terminal device is UE and the network device is a base station.

In a wireless network, one UE may communicate with a plurality of base stations, which may be referred to as dual connectivity (DC), which is also referred to as multi-radio dual connectivity (MR-DC), and is represented uniformly by DC below. The plurality of base stations may be base stations belonging to a same radio access technology (RAT) (where for example, the base stations are all 4G base stations or all 5G base stations), or may be base stations of different RATs (where for example, one base station is a fourth-generation 4G base station, and another base station is a fifth-generation 5G base station).

Figure 16:
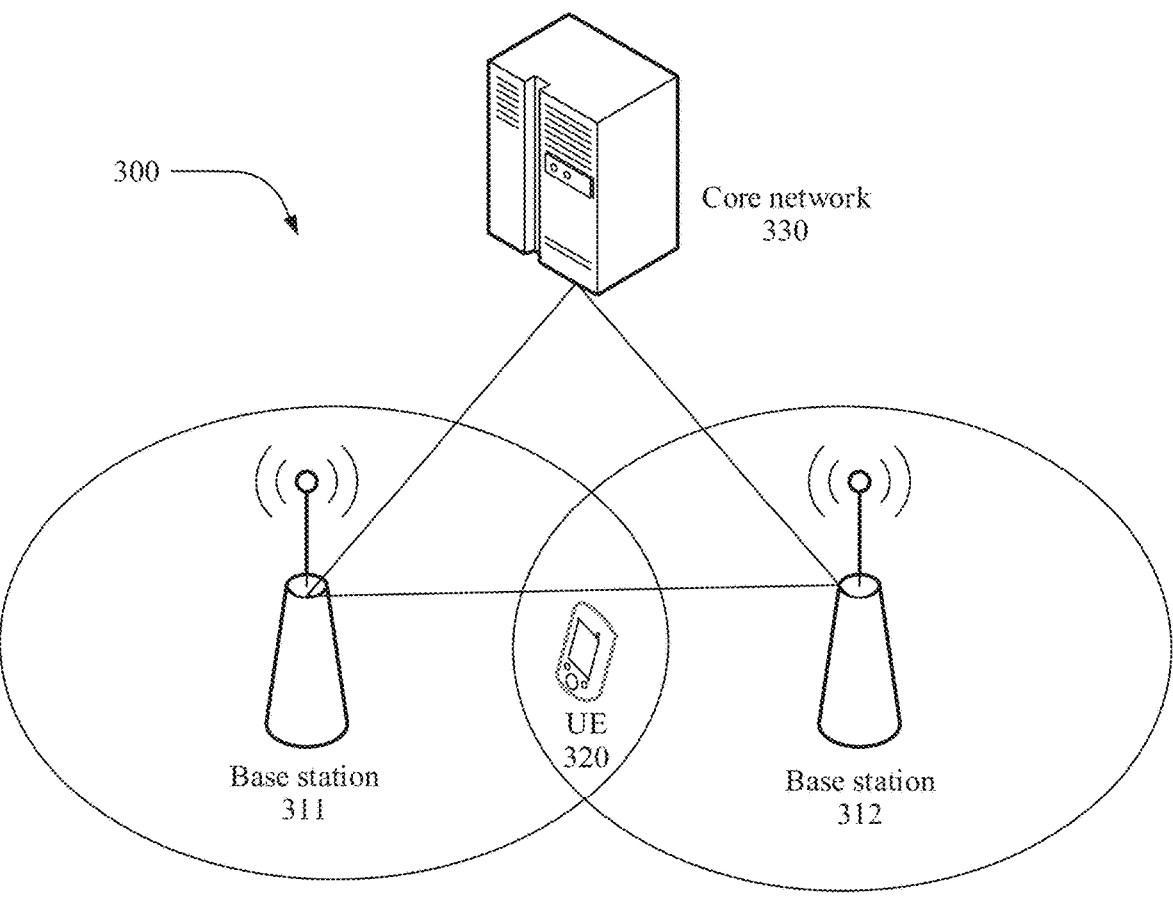
FIG. 16 is a schematic diagram of still another system architecture according to an embodiment of this application.

For example, FIG. 16 is another schematic diagram of a wireless communication system 300 applicable to an embodiment of this application. Refer to FIG. 16. UE 320 may communicate with a base station 311 and a base station 312 by using a DC technology, and the base station 311 and the base station 312 jointly access a core network 330. The core network 330 may be a 4G core network, or may be a 5G core network.

A network side may provide a communication service for UE by using resources of a plurality of base stations to provide high-rate transmission for the UE. In a DC scenario, for UE, a base station that exchanges control plane signaling with a core network is referred to as a master node (MN), and another base station is referred to as a secondary node (SN). The MN may be sometimes referred to as a master base station, and the SN may be sometimes referred to as a secondary base station. Each base station has a different RLC entity and a different MAC entity. In the DC scenario, data radio bearers (DRBs) may be classified into the following three types: a master cell group bearer (MCG bearer), a secondary cell group bearer (SCG bearer), and a split bearer. The MCG bearer indicates that an RLC entity and a MAC entity of the DRB are on a master base station, and the SCG bearer indicates that an RLC entity and a MAC entity of the DRB are on a secondary base station. The split bearer means that an RLC entity and a MAC entity of the DRB exist on both a master base station and a secondary base station. Similarly, a bearer whose PDCP is terminated on an MN may be referred to as an MN terminated bearer. That is, downlink (DL) data directly arrives at the MN from a core network, is processed by a PDCP/SDAP of the MN, and then is sent to UE through an RLC/MAC, and uplink (UL) data is processed by the PDCP/SDAP of the MN and then sent to the core network. A bearer whose PDCP is terminated on an SN may be referred to as an SN terminated bearer. That is, DL data directly arrives at the SN from a core network, is processed by PDCP/SDAP of the SN, and then is sent to UE through an RLC/MAC, and UL data is processed by the PDCP/SDAP of the SN and then sent to the core network. Note: In the present invention, an SDAP layer is a protocol layer that exists only when a terminal device is connected to a 5G core network.

Figure 17:
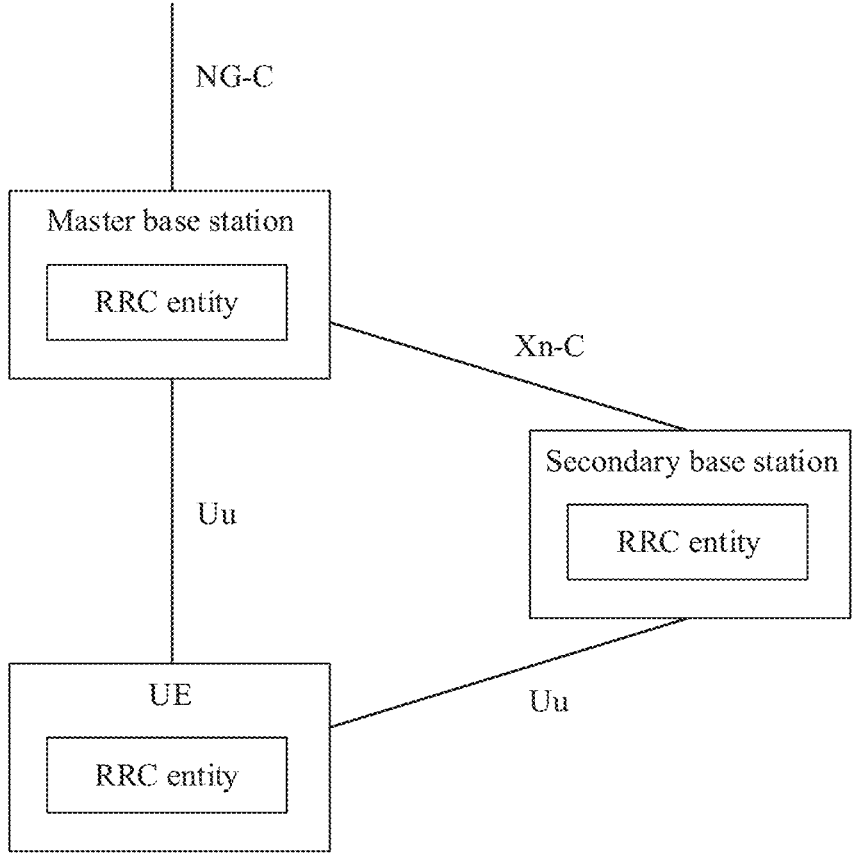
FIG. 17 is a schematic diagram of a DC control plane architecture according to an embodiment of this application.

In addition, in the dual connectivity, both the master base station and the secondary base station have an RRC entity, and both may generate an RRC message (namely, a control message, for example, a measurement message). For example, FIG. 17 is a schematic diagram of a DC control plane architecture applicable to an embodiment of this application. A master base station and a core network communicate with each other through a communication interface (for example, an NG-C interface), the master base station and a secondary base station communicate with each other through a communication interface (for example, an Xn-C interface), the master base station and UE communicate with each other through a communication interface (for example, a Uu interface), and the secondary base station and the UE communicate with each other through a communication interface (for example, a Uu interface).

The secondary base station may directly transmit an RRC message generated by the secondary base station to the UE. In this case, the RRC message transmitted by the UE to the secondary base station is also directly transmitted to the secondary base station. The RRC message directly exchanged between the secondary base station and the UE is referred to as a signaling radio bearer 3 (SRB3). Alternatively, the secondary base station may notify the master base station of the generated RRC message, and the master base station transmits the RRC message to the UE. In this case, the UE forwards, to the secondary base station by using the master base station, the RRC message that needs to be transmitted to the secondary base station. For UE in the DC scenario, a user plane of the secondary base station may be connected to a core network connected to the master base station, that is, the core network may directly send data to the UE by using the secondary base station.

It should be understood that an interface between devices in this application (where for example, the master base station and the secondary base station may communicate with each other through an Xn-C interface) is merely an example for description, and does not limit the protection scope of embodiments of this application.

Scenarios to which this application is applicable may include the following DC types: evolved universal terrestrial radio access and new radio dual connectivity (E-UTRA-NR dual connectivity, EN-DC), next generation radio access network evolved universal terrestrial radio access and new radio dual connectivity (NG-RAN E-UTRA-NR dual connectivity, NGEN-DC), new radio and evolved universal terrestrial radio access dual connectivity (NR-E-UTRA dual connectivity, NE-DC), and new radio and new radio dual connectivity (NR-NR dual connectivity, NR-DC).

In the EN-DC, the master base station is an LTE base station (for example, an eNB) connected to a 4G core network, and the secondary base station is an NR base station (for example, a gNB).

In the NGEN-DC, the master base station is an LTE base station connected to a 5G core network, and the secondary base station is an NR base station.

In the NE-DC, the master base station is an NR base station connected to a 5G core network, and the secondary base station is an LTE base station. The EN-DC is also referred to as an NSA because UE in an EN-DC network cannot camp on an NR cell at the beginning of 5G. An NR base station in which UE can camp on is sometimes referred to as an SA NR base station.

In the NR-DC, the master base station is an NR base station connected to a 5G core network, and the secondary base station is an NR base station.

Figure 18:
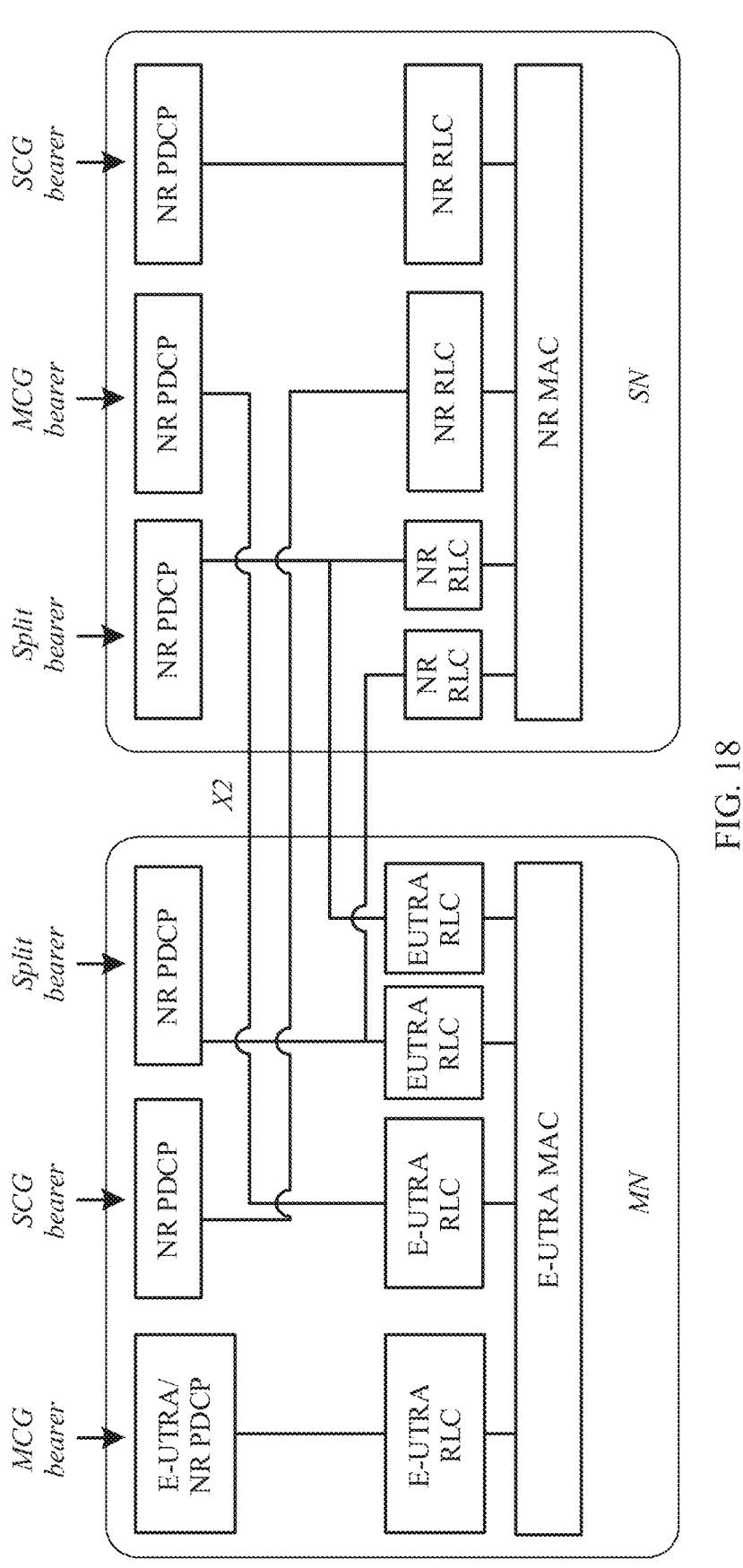
FIG. 18 is a schematic diagram of a protocol stack according to an embodiment of this application.
Figure 19:
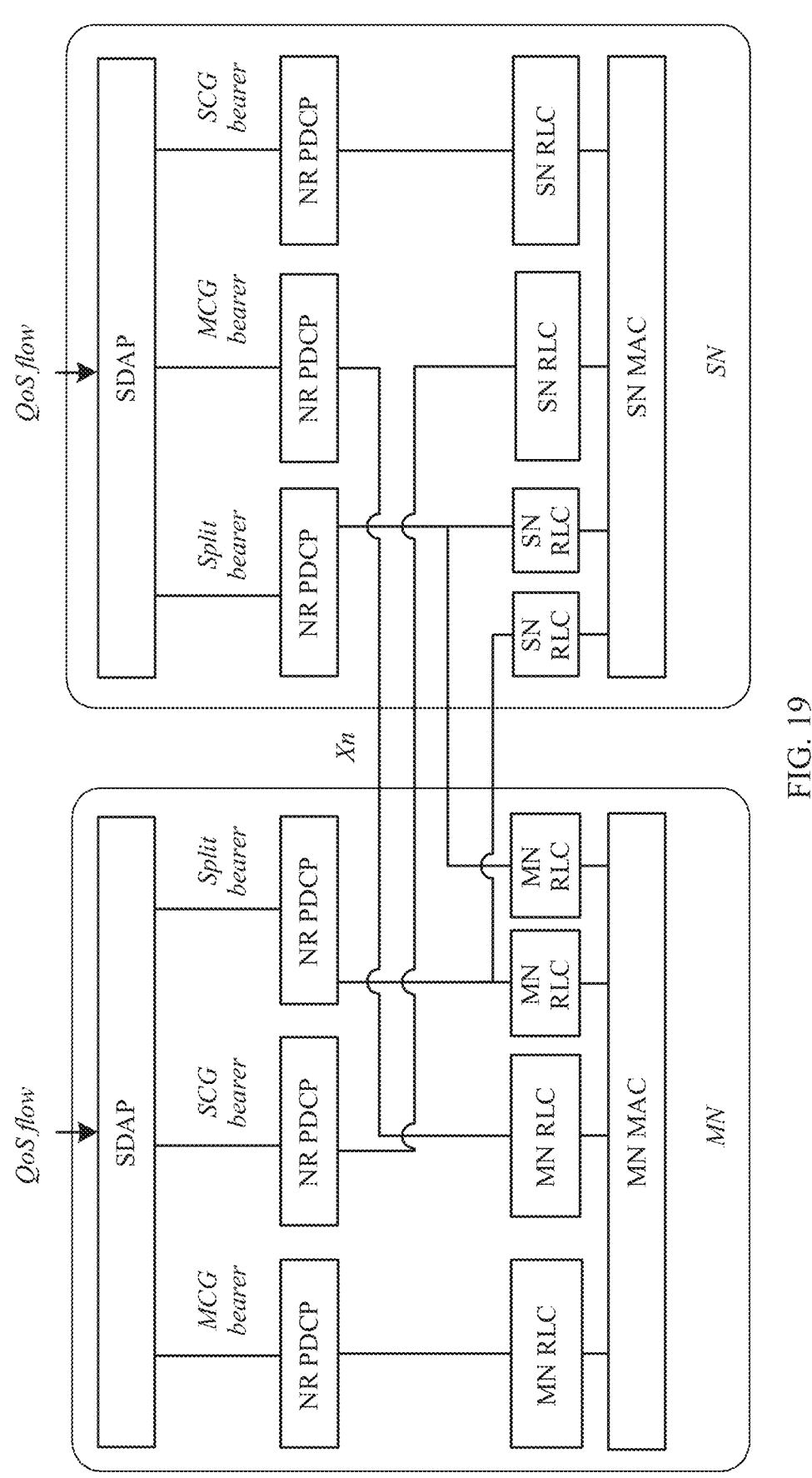
FIG. 19 is a schematic diagram of another protocol stack according to an embodiment of this application.

For example, FIG. 18 is a schematic diagram of protocol stacks on a network side for an MCG bearer, an SCG bearer, and a split bearer in an EN-DC. For example, FIG. 19 is a schematic diagram of protocol stacks on a network side for an MCG bearer, an SCG bearer, and a split bearer in an NGEN-DC/NE-DC/NR-DC. As can be seen from FIG. 18 and FIG. 19, transmission of each bearer needs to pass through an RLC/MAC and a PDCP/SDAP.

UE can simultaneously receive services from a plurality of cells under one base station. A serving cell group provided by an MN for the UE may be referred to as a master cell group (MCG), and the MCG includes one or more cells). A serving cell group provided by an SN for the UE may be referred to as a secondary cell group (SCG), and the SCG includes one or more cells. When there is only one cell in the MCG, the cell is a primary cell (PCell) of the UE. When there is only one cell in the SCG, the cell is a primary secondary cell (PSCell) of the UE. In an NR, to normalize various terms, a PCell and a PSCell are collectively referred to as a special cell (SpCell). When there are a plurality of cells in the MCG or SCG, a cell except the SpCell may be referred to as a secondary cell (SCell). Carrier aggregation can be performed on the SCell and the SpCell in the MCG or SCG to provide transmission resource for the UE.

It should be understood that the application scenario of this application is not limited to the foregoing DC scenario. This application is further applicable to a DC scenario of another system, for example, a DC scenario including a 5G base station and Wi-Fi, or a DC scenario including a base station deployed with a licensed spectrum and a base station deployed as an unlicensed spectrum.

For ease of understanding of embodiments of this application, several basic concepts in embodiments of this application are briefly described. It should be understood that basic concepts described below are briefly described by using a basic concept specified in a current protocol as an example, but embodiments of this application are not limited to being applied only to an existing communication system. Therefore, standard names appearing when the existing communication system is used as an example for description are all function descriptions, and a specific name is not limited.

1. Carrier aggregation (CA): a technology in which a plurality of carriers (cells) are configured for a single terminal device to perform data transmission together.

2. Primary cell PCell: a cell deployed on a primary frequency (or a cell working on a primary carrier). The PCell is a corresponding cell in which a terminal device initiates an initial connection establishment process or initiates a connection reestablishment process. To be specific, when the terminal device initiates an initial connection establishment process or initiates a connection reestablishment process in a cell, the cell is referred to as a PCell. During a handover, a cell may be indicated as a PCell.

3. Primary secondary cell PSCell: a cell in which a terminal device performs random access or initial physical uplink shared channel (PUSCH) transmission in an SCG (for example, UE initiates initial PUSCH transmission when an SCG change is performed and a random access process is not required), or a cell in which a terminal device performs random access in a synchronous reconfiguration process in an SCG cell.

4. Secondary cell SCell: a cell that works on a secondary carrier. Once an RRC connection is established, the SCell may be configured to provide additional radio resources. In a dual connectivity system, cells in an MCG and an SCG, except a PCell and a PSCell, may be referred to as SCells. It should be noted that, in some places, a PSCell is also referred to as an SCell, that is, the SCell also includes a PSCell.

5. Serving cell: For a terminal device in an RRC connected (RRC_CONNECTED) state, if carrier aggregation or dual connectivity is not configured, there is only one serving cell, namely, a PCell; or if carrier aggregation or dual connectivity is configured, a serving cell of the terminal device includes a PCell, a PSCell, and all SCells.

It should be understood that each carrier (component carrier, CC) corresponds to one independent cell. In a possible design, the terminal device configured with carrier aggregation or dual connectivity may be connected to one PCell and a maximum of 31 SCells. A PCell, a PSCell, and all SCells of the terminal device form a serving cell set of the terminal device. The serving cell of the terminal device may be a PCell, a PSCell, or an SCell.

In the conventional technology, in application of a dual connectivity technology, when the terminal device does not need to use a secondary cell group (SCG) to provide a communication service for the terminal device, the terminal device may temporarily suspend the SCG, for example, suspend a configuration of the SCG. In addition, the terminal device does not perform data transmission by using the SCG, thereby reducing energy consumption of the terminal device and a network device. In addition, when the terminal device needs to use the SCG to provide the communication service for the terminal device, the terminal device may restore the configuration of the SCG, and may further perform the data transmission by using the SCG, to meet a requirement of the terminal device for a data transmission rate.

Currently, in the conventional technology, in this embodiment of this application, that UE suspends the SCG may be understood as that the UE suspends signaling transmission and/or data transmission by using a communication link of the SCG, but the terminal retains or stores some or all configurations of the SCG.

Suspending the SCG means that: The UE temporarily stops using the SCG for the data transmission, but retains the configuration of the SCG. Specifically, when the UE does not need to use the SCG to provide a service for the UE or the UE does not need to use an SCG link, for example, when a data rate of the UE is low, the UE may suspend the SCG according to an indication of a network side, for example, retain the configuration of the SCG, and the UE does not perform data transmission by using the SCG. When the UE needs to use the SCG to provide the service for the UE or the UE needs to use the SCG link, for example, when a data rate of the UE increases, the UE may restore/resume or activate the configuration of the SCG according to an indication of the network side, and perform the data transmission by using the SCG.

It should be noted that the suspended SCG may also be referred to as that the SCG is in a suspended state, or the SCG is in an idle/inactive state, or the UE is in a dormancy, in a non-active state, in an inactive state, or the like in the SCG. Restoring the SCG may be referred to as restore SCG or resume SCG. The restored SCG or the unsuspended SCG may also be referred to as that the SCG is in a busy/active state, or that the UE is in a busy or active state, an activated state, or the like in the SCG. It should be noted that when the SCG is suspended, the terminal device does not need to monitor a PDCCH in the SCG, and does not need to perform beam management (that is, the terminal device does not send a measurement result of each beam in the SCG to an SN, and the SN does not notify the terminal device to change a current serving beam).

The present invention relates to how the UE communicates with the SCG when the UE is re-indicated by the network device to resume or activate. A scenario in which the SCG is suspended is mainly for a burst service of communication services, that is, a service communication requirement exists in a period of time, and no service communication requirement exists in a period of time. When the SCG is suspended, the terminal device does not monitor the PDCCH. Therefore, the present invention proposes a method for determining beams used by the terminal device to communicate with the SCG in a scenario in which the SCG is restored or activated again, if the timing advance timer does not expire, the terminal device does not need to perform random access to the SCG.

Figure 20:
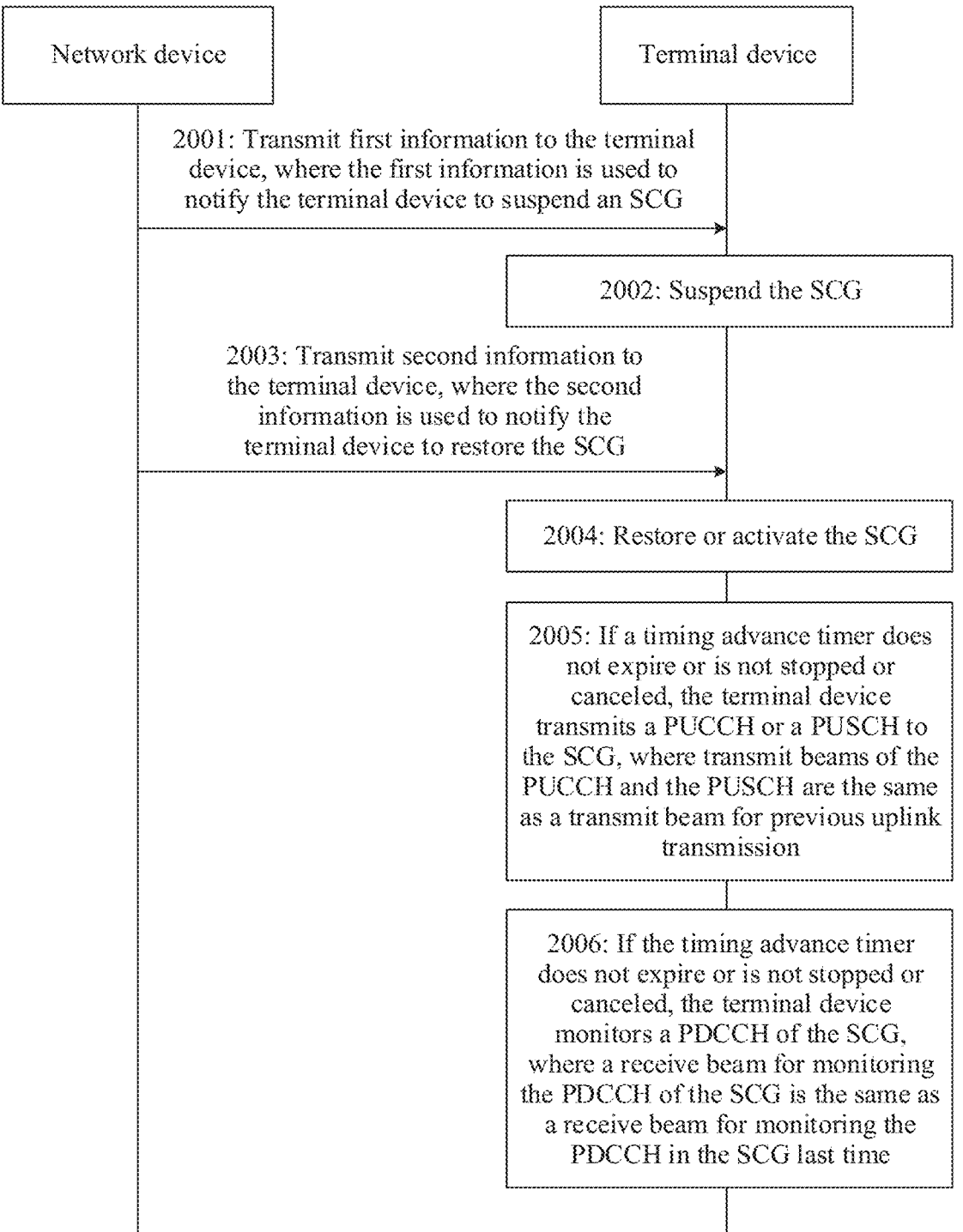
FIG. 20 is a schematic flowchart of still another communication method according to an embodiment of this application.

FIG. 20 is a schematic flowchart of another communication method according to an embodiment of this application. As shown in FIG. 20, the communication method includes the following step 2001 to step 2006.

2001: A network device transmits first information to a terminal device, where the first information is used to notify the terminal device to suspend an SCG.

It should be noted that the terminal device is a terminal device configured with an MR-DC.

It should be noted that the first information is transmitted by the network device, and the network device may be an MN or an SN. In other words, the first information may be transmitted by the MN, or may be transmitted by the SN. The MN or the SN may transmit the first information to the terminal device in a plurality of manners, for example, by using a MAC control element (CE), an RRC message, L1 indication information, or the like.

2002: The terminal device suspends the SCG.

After the terminal device receives the first information, the terminal device suspends the SCG. The terminal device retains a configuration of the SCG.

When the SCG is suspended, the terminal device performs beam failure detection in the SCG, and the terminal device also maintains a timing advance timer. The timing advance timer is started when the terminal device receives a timing advance command (TA command), and the terminal device may receive the timing advance command before receiving the first information.

When the SCG is suspended, the terminal device performs the beam failure detection before the timing advance timer expires. When the timing advance timer expires, the terminal device stops performing the beam failure detection. Before the timing advance timer expires, if the terminal device detects beam failure, the terminal device stops or cancels the timing advance timer.

2003: The network device transmits second information to the terminal device, where the second information is used to notify the terminal device to restore the SCG.

It should be noted that the second information is transmitted by the network device, and the network device may be an MN or an SN. In other words, the second information may be transmitted by the MN, or may be transmitted by the SN. The MN or the SN may transmit the second information to the terminal device in a plurality of manners. For example, if the second information is transmitted by the MN, the MN may transmit the second information by using a MAC control element (CE), an RRC message, L1 indication information, or the like. If the second information is transmitted by the SN, the SN may transmit the second information by using an RRC message.

2004: The terminal device restores or activates the SCG.

In this embodiment of this application, after receiving the second information, the terminal device restores or activates the SCG. The terminal device restores or activates configuration information of the SCG.

2005: If the timing advance timer does not expire or is not stopped or canceled, the terminal device transmits a PUCCH or a PUSCH to the SCG, where transmit beams of the PUCCH and the PUSCH are the same as a transmit beam for previous uplink transmission (namely, a transmit beam of uplink PUCCH or PUSCH transmission performed by the terminal device in the SCG before the SCG is suspended last time), or are the same as a beam corresponding to a previous uplink PUCCH or PUSCH (namely, the terminal device transmits a beam corresponding to the PUCCH or PUSCH in the SCG before the SCG is suspended last time).

2006: If the timing advance timer does not expire or is not stopped or canceled, the terminal device monitors a PDCCH of the SCG, where a receive beam for monitoring the PDCCH of the SCG is the same as a receive beam for monitoring the PDCCH in the SCG last time (namely, before the SCG is suspended last time, a receive beam used by the terminal device to monitor the PDCCH of the SCG).

If the timing advance timer expires or is stopped or canceled, the terminal device performs random access to the SCG.

Figure 21:
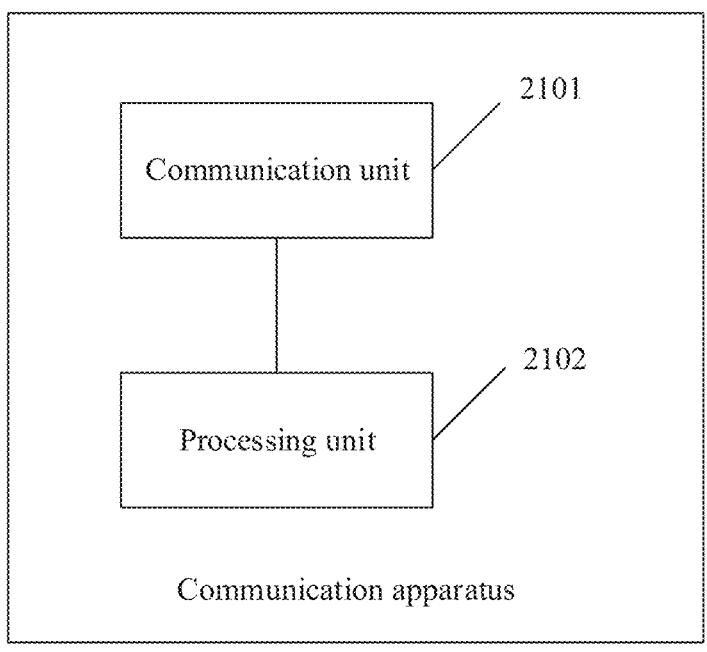
FIG. 21 is a schematic diagram of a structure of a communication apparatus according to an embodiment of this application.

FIG. 21 is a schematic diagram of a structure of a communication apparatus according to an embodiment of this application. The communication apparatus shown in FIG. 21 may be configured to perform some or all functions of the terminal device in the method embodiment described in FIG. 3. The apparatus may be a terminal device, an apparatus in a terminal device, or an apparatus that can be used together with a terminal device. The communication apparatus may alternatively be a chip system. The communication apparatus shown in FIG. 21 may include a communication unit 2101 and a processing unit 2102. The processing unit 2102 is configured to perform data processing. A receiving unit and a sending unit are integrated into the communication unit 2101. The communication unit 2101 may also be referred to as a transceiver unit. Alternatively, the communication unit 2101 may be split into a receiving unit and a sending unit. The processing unit 2102 and the communication unit 2101 below are similar. Details are not described below again.

The communication unit 2101 is configured to: after successfully performing first random access in a radio resource control inactive RRC inactive state, receive, by using a first receive beam, downlink control information DCI transmitted by an access network device, where the first receive beam is the same as a receive beam for downlink transmission of the first random access.

For other possible implementations of the communication apparatus, refer to related descriptions of functions of the terminal device in the method embodiment corresponding to FIG. 3. Details are not described herein again.

FIG. 21 is a schematic diagram of a structure of a communication apparatus according to an embodiment of this application. The communication apparatus shown in FIG. 21 may be configured to perform some or all functions of the terminal device in the method embodiments described in FIG. 6 to FIG. 11. The apparatus may be a terminal device, an apparatus in a terminal device, or an apparatus that can be used together with a terminal device. The communication apparatus may alternatively be a chip system. The communication apparatus shown in FIG. 21 may include a communication unit 2101 and a processing unit 2102.

The communication unit 2101 is configured to: in a radio resource control inactive RRC inactive state, transmit an RRC resume request and first uplink data to an access network device through a first configured grant CG resource by using a first transmit beam, where the first transmit beam is the same as a transmit beam of the terminal device in an RRC connected state, or the first transmit beam is the same as a transmit beam in a previous data transmission process in which the terminal device is in the RRC inactive state.

For other possible implementations of the communication apparatus, refer to related descriptions of functions of the terminal device in the method embodiments corresponding to FIG. 6 to FIG. 11. Details are not described herein again.

FIG. 21 is a schematic diagram of a structure of a communication apparatus according to an embodiment of this application. The communication apparatus shown in FIG. 21 may be configured to perform some or all functions of the first access network device in the method embodiments described in FIG. 12 and FIG. 13A and FIG. 13B. The apparatus may be a first access network device, or may be an apparatus in a first access network device, or an apparatus that can be used together with a terminal device. The communication apparatus may alternatively be a chip system. The communication apparatus shown in FIG. 21 may include a communication unit 2101 and a processing unit 2102.

The communication unit 2101 is configured to receive a second message 1 transmitted by a terminal device in a radio resource control inactive RRC inactive state, where the second message 1 includes a second preamble. The communication unit 2101 is further configured to transmit a second message 2 to the terminal device, where the second message 2 includes a second temporary cell radio network temporary identifier C-RNTI. The communication unit 2101 is further configured to receive a second message 3 transmitted by the terminal device, where the second message 3 includes a C-RNTI of the terminal device. The communication unit 2101 is further configured to transmit a second message 4 to the terminal device, where a PDCCH in the second message 4 is scrambled by a C-RNTI of the terminal device.

Optionally, the second temporary C-RNTI is used for retransmission scheduling of the second MSG3.

In a possible implementation, the communication unit 2101 is further configured to, before receiving the second message 1 transmitted by the terminal device in the radio resource control inactive RRC inactive state, receive a first message 1 transmitted by the terminal device in the radio resource control inactive RRC inactive state, where the first message 1 includes a first preamble. The communication unit 2101 is further configured to transmit a first message 2 to the terminal device, where the first message 2 includes a first temporary C-RNTI. The communication unit 2101 is further configured to receive a first message 3 transmitted by the terminal device, where the first message 3 includes a radio resource control RRC resume request and first uplink data. The communication unit 2101 is further configured to transmit a first message 4 to the terminal device, where the second message 4 includes contention resolution. The communication unit 2101 is further configured to transmit the first temporary C-RNTI to a second access network device, where a C-RNTI of the terminal device is the first temporary C-RNTI.

FIG. 21 is a schematic diagram of a structure of a communication apparatus according to an embodiment of this application. The communication apparatus shown in FIG. 21 may be configured to perform some or all functions of the first access network device in the method embodiments described in FIG. 14 and FIG. 15. The apparatus may be a first access network device, or may be an apparatus in a first access network device, or an apparatus that can be used together with a terminal device. The communication apparatus may alternatively be a chip system. The communication apparatus shown in FIG. 21 may include a communication unit 2101 and a processing unit 2102.

The communication unit 2101 is configured to receive a second message A transmitted by a terminal device in a radio resource control inactive RRC inactive state, where the second message A includes a second preamble and a cell radio network temporary identifier C-RNTI of the terminal device. The communication unit 2101 is further configured to transmit a second message B to the terminal device, where a PDCCH in the second message B is scrambled by using the C-RNTI of the terminal device.

In a possible implementation, the communication unit 2101 is further configured to, before receiving the second message A transmitted by the terminal device in the radio resource control inactive RRC inactive state, receive a first message A transmitted by the terminal device in the radio resource control inactive RRC inactive state, where the first message A includes a first preamble, a radio resource control RRC resume request, and first uplink data. The communication unit 2101 is further configured to transmit a first message B to the terminal device, where the first message B includes contention resolution and a first C-RNTI. The communication unit 2101 is further configured to transmit the first C-RNTI to the second access network device, where the C-RNTI of the terminal device is the first C-RNTI.

FIG. 21 is a schematic diagram of a structure of a communication apparatus according to an embodiment of this application. The communication apparatus shown in FIG. 21 may be configured to perform some or all functions of the terminal device in the method embodiment described in FIG. 20. The apparatus may be a terminal device, an apparatus in a terminal device, or an apparatus that can be used together with a terminal device. The communication apparatus may alternatively be a chip system. The communication apparatus shown in FIG. 21 may include a communication unit 2101 and a processing unit 2102.

The communication unit 2101 is configured to receive second information transmitted by a network device, where the second information is used to notify a terminal device to restore an SCG. The processing unit 2102 is configured to restore or activate the SCG. The communication unit 2101 is further configured to, if a timing advance timer does not expire or is not stopped or canceled, transmit a PUCCH or a PUSCH to the SCG, where transmit beams of the PUCCH and the PUSCH are the same as a transmit beam for previous uplink transmission, or monitor a PDCCH of the SCG, where a receive beam for monitoring the PDCCH of the SCG is the same as a receive beam for monitoring the PDCCH in the SCG last time.

Figure 22:
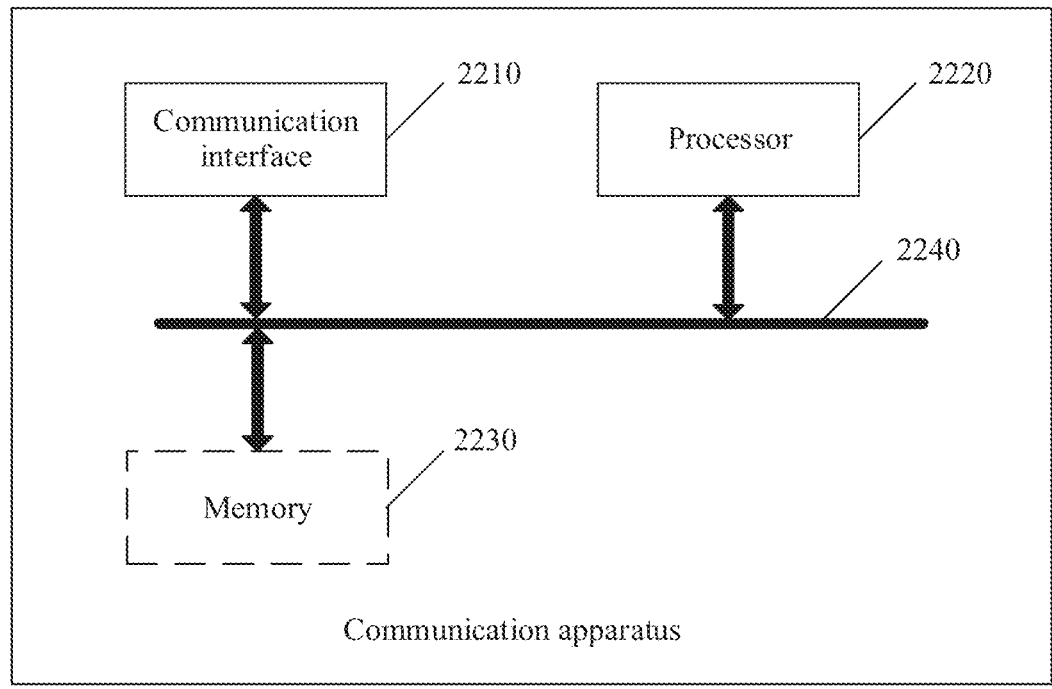
FIG. 22 is a schematic diagram of a structure of another communication apparatus according to an embodiment of this application.

FIG. 22 shows a communication apparatus 220 according to an embodiment of this application. The communication apparatus 220 is configured to implement functions of the terminal device in FIG. 3 to FIG. 15 or FIG. 20. The apparatus may be a terminal device or an apparatus used in a terminal device. The apparatus used in the terminal device may be a chip system or a chip in the terminal device. The chip system may include a chip, or may include a chip and another discrete component.

Alternatively, the communication apparatus 220 is configured to implement functions of the first access network device in FIG. 3 to FIG. 15. The apparatus may be a first access network device or an apparatus used in a first access network device. The apparatus used in the first access network device may be a chip system or a chip in the first access network device.

The communication apparatus 220 includes at least one processor 2220, configured to implement a data processing function of the terminal device or the first access network device in the method provided in embodiments of this application. The apparatus 220 may further include a communication interface 2210, configured to implement a transmitting and receiving operation of the terminal device or the first access network device in the method provided in embodiments of this application. In this embodiment of this application, the communication interface may be a transceiver, a circuit, a bus, a module, or a communication interface of another type, and is configured to communicate with another device by using a transmission medium. For example, the communication interface 2210 is used by an apparatus in the apparatus 220 to communicate with the another device. The processor 2220 transmits and receives data through the communication interface 2210, and is configured to implement the methods shown in FIG. 3 to FIG. 15 or FIG. 20 in the foregoing method embodiments.

The apparatus 220 may further include at least one memory 2230, configured to store program instructions and/or data. The memory 2230 is coupled to the processor 2220. The coupling in this embodiment of this application may be an indirect coupling or a communication connection between apparatuses, units, or modules in an electrical form, a mechanical form, or another form, and is used for information exchange between the apparatuses, the units, or the modules. The processor 2220 may operate in cooperation with the memory 2230. The processor 2220 may execute the program instructions stored in the memory 2230. At least one of the at least one memory may be included in the processor.

After the apparatus 220 is started, the processor 2220 may read a software program in the memory 2230, interpret and execute instructions of the software program, and process data of the software program. When needing to send data wirelessly, after performing baseband processing on the to-be-sent data, the processor 2220 outputs a baseband signal to a radio frequency circuit (not shown); and the radio frequency circuit performs radio frequency processing on the baseband signal and then transmits the radio frequency signal to the outside in an electromagnetic wave form through an antenna. When data is sent to the apparatus 220, the radio frequency circuit receives the radio frequency signal through the antenna, converts the radio frequency signal into a baseband signal, and outputs the baseband signal to the processor 2220. The processor 2220 converts the baseband signal into data, and processes the data.

In another implementation, the radio frequency circuit and the antenna may be disposed independent of the processor 2220 that performs baseband processing. For example, in a distributed scenario, the radio frequency circuit and the antenna may be disposed remotely and independent of the communication apparatus.

In this embodiment of this application, a specific connection medium between the communication interface 2210, the processor 2220, and the memory 2230 is not limited. In this embodiment of this application, the memory 2230, the processor 2220, and the communication interface 2210 are connected through a bus 2240 in FIG. 22, and the bus is represented by a thick line in FIG. 22. A connection manner between other components is only schematically described, and is not limited thereto. The bus may be classified into an address bus, a data bus, a control bus, or the like. For ease of representation, only one thick line is used to represent the bus in FIG. 22, but this does not mean that there is only one bus or only one type of bus.

When the apparatus 220 is specifically an apparatus of a terminal device or a first access network device, for example, when the apparatus 220 is specifically a chip or a chip system, the communication interface 2210 may output or receive a baseband signal. When the apparatus 220 is specifically a terminal device or a first access network device, the communication interface 2210 may output or receive a radio frequency signal. In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in embodiments of this application. The general purpose processor may be a microprocessor or any conventional processor or the like. The operations in the methods disclosed with reference to embodiments of this application may be directly performed and completed by a hardware processor, or may be performed and completed by a combination of hardware and software modules in the processor.

An embodiment of this application further provides a computer-readable storage medium. The computer-readable storage medium stores instructions. When the instructions are run on a processor, method procedures in the foregoing method embodiments are implemented.

An embodiment of this application further provides a computer program product. When the computer program product runs on a processor, method procedures in the foregoing method embodiments are implemented.

It should be noted that, for brief description, the foregoing method embodiments are described as a combination of a series of actions. However, persons skilled in the art should understand that this application is not limited to the described order of the actions, because according to this application, some operations may be performed in other orders or simultaneously. It should be further appreciated by persons skilled in the art that embodiments described in this specification all belong to embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease of description and brevity, for functions of the apparatuses and devices provided in embodiments of this application and operations performed by the apparatuses and devices, refer to related descriptions of the method embodiments of this application. The method embodiments and the apparatus embodiments may also be mutually referenced, combined, or cited.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A communication method comprising:
   accessing, by a terminal device, an access network device by performing first random access in a radio resource control inactive (RRC inactive) state;
   receiving, by the terminal device by using a first receive beam for downlink transmission of the first random access, downlink control information (DCI) transmitted by the access network device;
   receiving, by the terminal device, indication information transmitted by the access network device, wherein the indication information indicates to monitor a physical downlink control channel (PDCCH) corresponding to a cell radio network temporary identifier (C-RNTI), and the C-RNTI is a C-RNTI of the terminal device; and
monitoring, by the terminal device, the PDCCH corresponding to the C-RNTI, wherein the DCI is carried on the PDCCH corresponding to the C-RNTI, and wherein the indication information is a first RRC release message, wherein the first RRC release message does not carry a next hop chain counter NCC indication, an inactive-radio network temporary identifier (I-RNTI), or a pause configuration, and wherein the pause configuration indicates the terminal device to stay in the RRC inactive state.

2. The method according to claim 1, wherein the DCI indicates a downlink transmission resource or an uplink transmission resource, and wherein the method further comprises:
   performing downlink transmission through the downlink transmission resource or uplink transmission through the uplink transmission resource by using a first transmit beam, wherein a receive beam of the downlink transmission is same as the first receive beam, and the first transmit beam is same as a transmit beam for uplink transmission of the first random access.

3. The method according to claim 1, wherein the first random access is four-step random access, and the first receive beam is same as a receive beam of a message 2 or a message 4 in the first random access.

4. The method according to claim 1, wherein the first random access is two-step random access, and the first receive beam is same as a receive beam of a message B in the first random access.

5. The method according to claim 2, wherein the first random access is four-step random access, and the first transmit beam is same as a transmit beam of a message 1 or a message 3 in the first random access.

6. The method according to claim 2, wherein the first random access is two-step random access, and the first transmit beam is same as a transmit beam of a message A in the first random access.

7. The method according to claim 1, wherein the first random access is four-step random access, and the indication information is carried in message 4 of the first random access or the first random access is two-step random access, and the indication information is carried in message B of the first random access.

8. The method according to claim 1, wherein the method comprises indicating to monitor the PDCCH corresponding to the C-RNTI.

9. The method according to claim 1, wherein the first receive beam corresponds to a first preamble or the first receive beam corresponds to a time-frequency resource of a first preamble; and wherein
   the first random access is four-step random access, and the first preamble is a preamble in message 1 of the first random access or the first random access is two-step random access, and the first preamble is a preamble in message A of the first random access.

10. A communication apparatus, comprising:
    at least one processor executing instructions to cause the apparatus to:
    access an access network device by performing first random access in a radio resource control inactive (RRC inactive) state;
    receive, by using a first receive beam for downlink transmission of the first random access, downlink control information (DCI) transmitted by the access network device;

receiving indication information transmitted by the access network device, wherein the indication information indicates to monitor a physical downlink control channel (PDCCH) corresponding to a cell radio network temporary identifier (C-RNTI), and the C-RNTI is a C-RNTI of the terminal device; and monitoring the PDCCH corresponding to the C-RNTI, wherein the DCI is carried on the PDCCH corresponding to the C-RNTI, and wherein the indication information is a first RRC release message, wherein the first RRC release message does not carry a next hop chain counter NCC indication, an inactive-radio network temporary identifier (I-RNTI), or a pause configuration, and wherein the pause configuration indicates the terminal device to stay in the RRC inactive state.

11. The communication apparatus according to claim 10, wherein the DCI indicates a downlink transmission resource or an uplink transmission resource; and the at least one processor executing instructions to cause the apparatus to:

perform downlink transmission through the downlink transmission resource or uplink transmission through the uplink transmission resource by using a first transmit beam, wherein a receive beam of the downlink transmission is same as the first receive beam, and the first transmit beam is same as a transmit beam for uplink transmission of the first random access.

12. The communication apparatus according to claim 10, wherein the first random access is four-step random access, and the first receive beam is same as a receive beam of a message 2 or a message 4 in the first random access.

13. The communication apparatus according to claim 10, wherein the first random access is two-step random access, and the first receive beam is same as a receive beam of a message B in the first random access.

14. The communication apparatus according to claim 11, wherein the first random access is four-step random access, and the first transmit beam is same as a transmit beam of a message 1 or a message 3 in the first random access.

15. The communication apparatus according to claim 11, wherein the first random access is two-step random access, and the first transmit beam is same as a transmit beam of a message A in the first random access.

16. The communication apparatus according to claim 10, wherein the first random access is four-step random access, and the indication information is carried in message 4 of the first random access or the first random access is two-step random access, and the indication information is carried in message B of the first random access.

17. The communication apparatus according to claim 10, wherein the at least one processor executing instructions to cause the apparatus to: indicate to monitor the PDCCH corresponding to the C-RNTI.

18. The communication apparatus according to claim 10, wherein the first receive beam corresponds to a first preamble or the first receive beam corresponds to a time-frequency resource of a first preamble, wherein the first random access is four-step random access, and the first preamble is a preamble in message 1 of the first random access; or the first random access is two-step random access, and the first preamble is a preamble in message A of the first random access.

* * * * *